(12) United States Patent
Guo et al.

(10) Patent No.: US 11,483,111 B2
(45) Date of Patent: Oct. 25, 2022

(54) DATA TRANSMISSION METHOD, RELATED APPARATUS, AND SYSTEM

(71) Applicant: Huawei Technologies Co., Ltd., Shenzhen (CN)

(72) Inventors: Zhiheng Guo, Beijing (CN); Leiming Zhang, Beijing (CN); Xinqian Xie, Beijing (CN); Xingqing Cheng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/368,607

(22) Filed: Mar. 28, 2019

(65) Prior Publication Data
US 2019/0222386 A1 Jul. 18, 2019

Related U.S. Application Data

(63) Continuation of application No. PCT/CN2017/103374, filed on Sep. 26, 2017.

(30) Foreign Application Priority Data

Sep. 30, 2016 (CN) .......................... 201610876822.5

(51) Int. Cl.
*H04L 5/00* (2006.01)
*H04W 72/12* (2009.01)
(Continued)

(52) U.S. Cl.
CPC .......... *H04L 5/0048* (2013.01); *H04L 5/0051* (2013.01); *H04L 5/0094* (2013.01);
(Continued)

(58) Field of Classification Search
CPC .................................................. H04L 5/0048
See application file for complete search history.

(56) References Cited

U.S. PATENT DOCUMENTS

2014/0016622 A1 1/2014 Bao et al.
2014/0133435 A1 5/2014 Forenza et al.
(Continued)

FOREIGN PATENT DOCUMENTS

CN 102739382 A 10/2012
CN 103095615 A 5/2013
(Continued)

OTHER PUBLICATIONS

"DMRS Design Issues in NR," 3GPP TSG-RAN WG1 Meeting #86, Gothenburg, Sweden, R1-166907, pp. 1-7, 3rd Seneration Partnership Project, Valbonne, France (Aug. 22-26, 2016).
(Continued)

*Primary Examiner* — Kodzovi Acolatse
*Assistant Examiner* — Abdeltif Ajid
(74) *Attorney, Agent, or Firm* — Leydig, Voit & Mayer, Ltd.

(57) ABSTRACT

A data transmission method includes determining, by a base station, a first phase noise compensation reference signal (PCRS) port set and a second PCRS port set in a first scheduling period, where the first PCRS port set includes at least one port used to transmit a PCRS, but the second PCRS port set does not include a port used to transmit a PCRS in the first scheduling period; determining, by the base station, a first time-frequency resource element corresponding to the at least one port used to transmit a PCRS in the first PCRS port set; if a quantity of first time-frequency resource elements is greater than or equal to 1, sending, by the base station, a PCRS to user equipment on the first time-frequency resource element; and sending, by the base station, data to the user equipment on a second time-frequency resource element corresponding to the second PCRS port set.

20 Claims, 19 Drawing Sheets

(51) Int. Cl.
*H04W 72/04* (2009.01)
*H04W 88/02* (2009.01)
*H04W 88/08* (2009.01)

(52) U.S. Cl.
CPC ........... *H04W 72/04* (2013.01); *H04W 72/12* (2013.01); *H04W 88/02* (2013.01); *H04W 88/08* (2013.01)

(56) References Cited

U.S. PATENT DOCUMENTS

| | | | |
|---|---|---|---|
| 2017/0311321 A1 | 10/2017 | Kakishima et al. | |
| 2018/0041259 A1* | 2/2018 | Kim | H04W 72/042 |
| 2019/0097776 A1* | 3/2019 | Kim | H04L 27/2611 |
| 2019/0245666 A1* | 8/2019 | Wang | H04W 72/042 |
| 2019/0245728 A1* | 8/2019 | Li | H04L 27/2691 |
| 2019/0342865 A1* | 11/2019 | Shin | H04L 5/10 |
| 2019/0356463 A1* | 11/2019 | Zhang | H04L 5/0094 |
| 2020/0304256 A1* | 9/2020 | Park | H04W 16/28 |

FOREIGN PATENT DOCUMENTS

| | | |
|---|---|---|
| CN | 103139128 A | 6/2013 |
| CN | 103944644 A | 7/2014 |
| CN | 104798332 A | 7/2015 |
| EP | 3206324 A1 | 8/2017 |
| JP | 2016507195 A | 3/2016 |
| WO | 2013074031 A1 | 5/2013 |
| WO | 2014126311 A1 | 8/2014 |
| WO | 2016000915 A1 | 1/2016 |
| WO | 2016047409 A1 | 3/2016 |
| WO | 2016056805 A1 | 4/2016 |
| WO | 2018063854 A1 | 4/2018 |

OTHER PUBLICATIONS

"DMRS Design Issues in NR," 3GPP TSG RAN WG1 Meeting #86, Gothenburg, Sweden, R1-166907, XP051125635, pp. 1-7, 3rd Generation Partnership Project, Valbonne, France (Aug. 2016).
JP/2019-517286, Office Action, dated Dec. 11, 2020.
"Discussion on transmit beam coordination and QCL for NR," 3GPP TSG RAN WG1 Meeting #86, Gothenburg, Sweden, R1-166903, pp. 1-5, 3rd Generation Partnership Project, Valbonne, France (Aug. 22-26, 2016).
"Frame structure and DMRS positions," 3GPP TSG-RAN WG1 #86, Gothenburg, Sweden, R1-167079, pp. 1-6, 3rd Generation Partnership Project, Valbonne, France (Aug. 22-26, 2016).

* cited by examiner

TO

DATA TRANSMISSION METHOD, RELATED APPARATUS, AND SYSTEM

CROSS-REFERENCE TO RELATED APPLICATIONS

This application is a continuation of International Application No. PCT/CN2017/103374, filed on Sep. 26, 2017, which claims priority to Chinese Patent Application No. 201610876822.5, filed on Sep. 30, 2016, the disclosures of the aforementioned applications are hereby incorporated by reference in their entireties.

TECHNICAL FIELD

This application relates to the field of communications technologies, and in particular, to a data transmission method, a related apparatus, and a system.

BACKGROUND

In a communications system, a phase of an output signal randomly changes when various radio frequency components in communications devices such as an evolved NodeB (eNB) and user equipment (UE) are affected by noise, that is, phase noise is generated, resulting in difficulty in signal demodulation. Phase noise usually results in a common phase noise error (CPE) and inter-subcarrier interference (ICI). For a signal on a subcarrier, a CPE is distortion caused when the signal on the subcarrier is affected by phase noise, and ICI is interference from a signal carried on another subcarrier to the signal on the subcarrier due to phase noise. In a low-frequency system, because phase noise increases mainly with an increase in a carrier frequency, phase noise has relatively small impact. However, in a high-frequency system, phase noise causes significant demodulation performance degradation.

Currently, a phase noise compensation reference signal (PCRS) used to compensate for phase noise is designed. Specifically, as shown in FIG. 1A and FIG. 1B, a resource block 2 is used as an example. Two ports used to input a PCRS may be disposed, and a base station may select one of the PCRS ports in a scheduling period to perform PCRS transmission, so as to compensate for phase noise and improve signal transmission accuracy.

However, in an existing solution, if the base station schedules only one of the PCRS ports in a scheduling period to transmit a PCRS, data is not transmitted through the remaining unscheduled PCRS port. Consequently, PCRS port data transmission efficiency is reduced and PCRS port resources are wasted.

SUMMARY

Embodiments of this application provide a data transmission method, a related apparatus, and a system. In a scheduling period, a first time-frequency resource element used to transmit a PCRS may be determined, and valid data may be transmitted on all remaining time-frequency resource elements that are not used to transmit a PCRS, to improve PCRS port data transmission efficiency and effectively save PCRS port resources.

In view of the above, a first aspect of this application provides a data transmission method, and the method is first described from a perspective of an eNB. The eNB performs the following steps.

In a communications system, a phase of an output signal probably randomly changes when various radio frequency components in an eNB and UE are affected by noise, resulting in difficulty in signal demodulation. Therefore, a signal used to compensate for phase noise is designed, that is, a PCRS. First, the eNB may determine a first PCRS port set and a second PCRS port set in a first scheduling period. Each of the first PCRS port set and the second PCRS port set includes at least one PCRS port. A difference lies in that a PCRS port in the first PCRS port set may be used to transmit a PCRS in the first scheduling period, but a PCRS port in the second PCRS port set is not used to transmit a PCRS in the first scheduling period. Certainly, phase noise may not exist in a special case, and a PCRS does not need to be transmitted through the first PCRS port set.

Then, the eNB needs to determine at least one first time-frequency resource element that is in the first PCRS port set and that is actually used to transmit a PCRS, and a time-frequency resource element is also referred to as a resource element. If the eNB determines that a quantity of first time-frequency resource elements is greater than or equal to 1, it indicates that phase noise exists in the first scheduling period, and therefore a PCRS needs to be sent to target user equipment on the first time-frequency resource element, to compensate for phase noise. If the eNB determines that a quantity of first time-frequency resource elements is equal to 0, it indicates that very slight phase noise exists in the first scheduling period and is almost negligible, and therefore a PCRS does not need to be sent in the first scheduling period.

In addition, the eNB also determines that data may be sent to the target UE on a second time-frequency resource element corresponding to the second PCRS port set.

This embodiment of this application provides a data transmission method. The eNB first determines the first PCRS port set and the second PCRS port set in the first scheduling period, where the first PCRS port set includes at least one port used to transmit a PCRS, but the second PCRS port set does not include a port used to transmit a PCRS in the first scheduling period; then the eNB determines a first time-frequency resource element corresponding to the at least one port used to transmit a PCRS in the first PCRS port set; and the eNB sends the PCRS to the target UE on the first time-frequency resource element, and sends the data to the target UE on the second time-frequency resource element corresponding to the second PCRS port set. In the foregoing manner, in a scheduling period, the eNB determines the first time-frequency resource element used to transmit a PCRS, and valid data may be transmitted on all remaining time-frequency resource elements that are not used to transmit a PCRS, to improve PCRS port data transmission efficiency and effectively save PCRS port resources.

With reference to the first aspect of the embodiments of this application, in a first possible implementation, after determining the first time-frequency resource element corresponding to the at least one port used to transmit a PCRS in the first PCRS port set, the eNB may further perform the following step:

In addition to uplink data receiving and sending, downlink data receiving and sending may be performed between the eNB and the UE. In other words, the eNB may receive, on the first time-frequency resource element, a PCRS sent by the target UE, and the eNB receives, on the second time-frequency resource element corresponding to the second PCRS port set, data sent by the target UE.

In this embodiment of this application, the eNB may receive, by using the first time-frequency resource element, the PCRS sent by the target UE, and may further send the PCRS to the target UE by using the first time-frequency resource element. Similarly, the eNB receives, by using the second time-frequency resource element, the data sent by the target UE, and may further send the data to the target UE by using the second time-frequency resource element. In the foregoing manner, integrity of uplink data transmission and downlink data transmission is ensured, thereby improving practicability of this solution.

With reference to the first aspect of the embodiments of this application, in a second possible implementation, after determining the first PCRS port set and the second PCRS port set in the first scheduling period, the eNB may further specifically perform the following step:

The eNB further generates port indication information corresponding to the first scheduling period, and then the eNB sends the port indication information to the target UE, where the port indication information is mainly used to indicate that the target UE needs to receive the PCRS through the first PCRS port set and receive the data through the second PCRS port set.

The port indication information may be considered as an agreement negotiated by the eNB and the UE, and by using the port indication information, the UE can learn of a path on which the eNB is to send the PCRS and/or the data to the UE.

In this embodiment of this application, after the eNB determines the first PCRS port set and the second PCRS port set in the first scheduling period, the eNB generates the port indication information corresponding to the first scheduling period, and then sends the port indication information to the target UE, so that the target UE determines, according to the port indication information, to receive the PCRS through the first PCRS port set and receive the data through the second PCRS port set. In the foregoing manner, the eNB may use the port indication information to notify the UE of a specific PCRS port for receiving data, to ensure feasibility of this solution. In addition, statuses of data and PCRS receiving and sending between the eNB and the UE may be determined by using the port indication information, to improve accuracy and reliability of this solution.

With reference to the second possible implementation of the first aspect of the embodiments of this application, in a third possible implementation, that the eNB sends the port indication information to the target UE may specifically include:

the eNB may send a port number of at least one PCRS port in the second PCRS port set to the target UE, and then the target UE determines the at least one PCRS port in the second PCRS port set based on the port number. In other words, the port indication information is first indication information, and the eNB may add the port number of the at least one PCRS port in the second PCRS port set to the first indication information.

It should be noted that, in addition to a specific PCRS port that is corresponding to a port number and that is used to transmit data, the eNB may notify the target UE of a specific PCRS port that is corresponding to a port number and that is used to transmit a PCRS.

In this embodiment of this application, the UE determines, by using a port number, to receive the PCRS through the first PCRS port set and receive the data through the second PCRS port set. In the foregoing manner, the eNB may notify the target UE of a specific PCRS port that is corresponding to the port number and that is used to receive data, and therefore a feasible manner of determining data and PCRS receiving and sending between the eNB and the UE is provided, to improve feasibility and reliability of this solution.

With reference to the second possible implementation of the first aspect of the embodiments of this application, in a fourth possible implementation, that the eNB sends the port indication information to the target UE may specifically include:

the eNB may send a quantity of PCRS ports in the first PCRS port set and/or a quantity of PCRS ports in the second PCRS port set to the target UE, so that the target UE determines, based on the quantity of PCRS ports, a specific PCRS port for receiving data. In other words, the port indication information is second indication information, and the eNB may add, to the second indication information, identifier information corresponding to the quantity of PCRS ports in the first PCRS port set and/or the quantity of PCRS ports in the second PCRS port set.

In this embodiment of this application, the UE determines, through a quantity of PCRS ports, to receive the PCRS through the first PCRS port set and receive the data through the second PCRS port set. In the foregoing manner, the eNB may notify the target UE of a specific PCRS port that is corresponding to the quantity of PCRS ports and that is used to receive data and a specific PCRS port that is corresponding to the quantity of PCRS ports and that is used to receive a PCRS, and therefore a feasible manner of determining data and PCRS receiving and sending between the eNB and the UE is provided, to improve feasibility and reliability of this solution.

With reference to the second possible implementation of the first aspect of the embodiments of this application, in a fifth possible implementation, that the eNB sends the port indication information to the target UE may specifically include:

the eNB may directly send PCRS allocation information to the target UE, namely, third indication information, and add, to the third indication information, an identifier of a PCRS allocated by the eNB to the target UE in the first PCRS port set and a first time-frequency resource element on which the PCRS is located.

Herein, it may be considered that the eNB does not need to indirectly notify, by using other attribute information, the target UE of time-frequency resource elements for transmitting a PCRS and data. Instead, the eNB directly notifies the target UE of specific data and a specific PCRS to be sent to the target UE.

In this embodiment of this application, the UE directly determines, by using the PCRS allocation information, the first time-frequency resource element used to transmit a PCRS, and the UE receives, by using the first time-frequency resource element, the PCRS sent by the eNB. In the foregoing manner, the UE can more quickly and accurately learn of a specific time-frequency resource element for receiving a PCRS, without a need to determine a mapping relationship, to save computing resources of the UE and further improve data transmission reliability.

With reference to the first aspect of the embodiments of this application, in a sixth possible implementation, that the eNB determines the first time-frequency resource element corresponding to the at least one port used to transmit a PCRS in the first PCRS port set may further specifically include the following step:

The eNB determines, based on a current channel status, a target modulation and coding scheme (MCS) to be used for communication with the target UE, and then the eNB notifies the target UE of the to-be-used target MCS by using control signaling. In addition, an association relationship between an MCS and a PCRS transmission pattern is maintained on both the eNB side and the UE side. In this case, the target UE may determine, based on the notified target MCS in the control signaling, whether a PCRS is transmitted through a PCRS port. If it is determined that a PCRS is transmitted, the target UE may further determine which time-frequency resource element of which port is used to transmit the PCRS. The eNB determines, based on the target MCS, the first time-frequency resource element corresponding to the at least one port used to transmit a PCRS in the first PCRS port set, and may configure the first time-frequency resource element in advance, or may adjust the first time-frequency resource element based on an actual situation.

In this embodiment of this application, the eNB determines the corresponding first time-frequency resource element in the first PCRS port set. Specifically, the eNB may first determine the MCS, and the target MCS is used to indicate an MCS that is used by the eNB to send the data to the target UE. Then the eNB determines, based on the target MCS, the first time-frequency resource element corresponding to the at least one port used to transmit a PCRS in the first PCRS port set. In addition, the target UE may also receive, in the first scheduling period by using the first time-frequency resource element based on the target MCS determined by the eNB, the PCRS sent by the eNB. In the foregoing manner, the eNB notifies, in an implicit manner without a need to occupy additional bits in control signaling, the UE of the corresponding first time-frequency resource element used to transmit a PCRS. Based on the MCS scheduled by the eNB, the UE can learn of the first time-frequency resource element used to transmit a PCRS, to reduce overheads of the control signaling and improve efficiency of a communications system.

With reference to the first aspect of the embodiments of this application, in a seventh possible implementation, that the eNB determines the first time-frequency resource element corresponding to the at least one port used to transmit a PCRS in the first PCRS port set may specifically include the following step:

The eNB may detect, in the first scheduling period, scheduling bandwidth for sending the data to the target UE, and the eNB determines, based on the determined scheduling bandwidth, the first time-frequency resource element used to transmit a PCRS, that is, determines the first time-frequency resource element corresponding to the at least one port used to transmit a PCRS in the first PCRS port set.

In this embodiment of this application, the eNB determines the corresponding first time-frequency resource element in the first PCRS port set. Specifically, the eNB may first determine the scheduling bandwidth for sending the data to the target UE in the first scheduling period, and then the eNB determines, based on the scheduling bandwidth, the first time-frequency resource element corresponding to the at least one port used to transmit a PCRS in the first PCRS port set. In the foregoing manner, the eNB may determine the first time-frequency resource element based on the scheduling bandwidth, to improve practicability and operability of this solution.

With reference to the sixth or seventh possible implementation of the first aspect of the embodiments of this application, in an eighth possible implementation, after determining the first time-frequency resource element corresponding to the at least one port used to transmit a PCRS in the first PCRS port set, the eNB may further perform the following step:

A scheduler in the eNB starts to schedule a next period, namely, a second scheduling period, and then updates the first time-frequency resource element in the second scheduling period to obtain an updated third time-frequency resource element. The eNB sends the PCRS to the UE on the third time-frequency resource element, and the eNB also sends valid data on a time-frequency resource element in the first PCRS port set other than the third time-frequency resource element.

Further, in this embodiment of this application, after the eNB determines the first time-frequency resource element corresponding to the at least one port used to transmit a PCRS in the first PCRS port set, the eNB may further update the first time-frequency resource element in the second scheduling period to obtain the updated third time-frequency resource element, and the eNB sends the PCRS on the third time-frequency resource element. In the foregoing manner, the eNB may dynamically configure a PCRS in each scheduling period, and determine a time-frequency resource element used to transmit a PCRS, to improve practicability and flexibility of this solution.

A second aspect of this application provides a data transmission method, and the method is then described from a perspective of UE. The UE performs the following steps:

In a communications system, a phase of an output signal probably randomly changes when various radio frequency components in an eNB and UE are affected by noise, resulting in difficulty in signal demodulation. Therefore, a signal used to compensate for phase noise is designed, that is, a PCRS. First, if the eNB determines that a quantity of first time-frequency resource elements is greater than or equal to 1, the UE may receive, in a first scheduling period, a PCRS sent by the eNB on a first time-frequency resource element, and may further receive valid data on a second time-frequency resource element. The first time-frequency resource element is in a first PCRS port set, and the second time-frequency resource element is a time-frequency resource element in a second PCRS port set.

This embodiment of this application provides a data transmission method. The eNB first determines the first PCRS port set and the second PCRS port set in the first scheduling period, where the first PCRS port set includes at least one port used to transmit a PCRS, but the second PCRS port set does not include a port used to transmit a PCRS in the first scheduling period; then the eNB determines a first time-frequency resource element corresponding to the at least one port used to transmit a PCRS in the first PCRS port set; and the eNB sends a PCRS to target UE on the first time-frequency resource element, and sends data to the target UE on the second time-frequency resource element corresponding to the second PCRS port set. In the foregoing manner, in a scheduling period, the eNB determines the first time-frequency resource element used to transmit a PCRS, and valid data may be transmitted on all remaining time-frequency resource elements that are not used to transmit a PCRS, to improve PCRS port data transmission efficiency and effectively save PCRS port resources.

With reference to the second aspect of the embodiments of this application, in a first possible implementation, the UE may further perform the following step:

In addition to uplink data receiving and sending, downlink data receiving and sending may be performed between the eNB and the UE. In other words, the UE may send a PCRS to the eNB by using the first time-frequency resource element, and send data to the eNB by using the second time-frequency resource element.

In this embodiment of this application, the eNB may receive, by using the first time-frequency resource element, the PCRS sent by the target UE, and may further send the PCRS to the target UE by using the first time-frequency resource element. Similarly, the eNB receives, by using the second time-frequency resource element, the data sent by the target UE, and may further send the data to the target UE by using the second time-frequency resource element. In the foregoing manner, integrity of uplink data transmission and downlink data transmission is ensured, thereby improving practicability of this solution.

With reference to the second aspect of the embodiments of this application, in a second possible implementation, before the UE receives, in the first scheduling period by using the first time-frequency resource element, the PCRS sent by the eNB, the UE may further specifically perform the following step:

The eNB further generates port indication information corresponding to the first scheduling period, and then sends the port indication information to the UE. The UE receives the port indication information sent by the base station, and may learn, by using the port indication information, that the PCRS needs to be received through the first PCRS port set and the valid data needs to be received through the second PCRS port set.

The port indication information may be considered as an agreement negotiated by the eNB and the UE, and by using the port indication information, the UE can learn of a path on which the eNB is to send the PCRS and/or the data to the UE.

In this embodiment of this application, after the eNB determines the first PCRS port set and the second PCRS port set in the first scheduling period, the eNB generates the port indication information corresponding to the first scheduling period, and then sends the port indication information to the target UE, so that the target UE determines, according to the port indication information, to receive the PCRS through the first PCRS port set and receive the data through the second PCRS port set. In the foregoing manner, the eNB may use the port indication information to notify the UE of a specific PCRS port for receiving data, to ensure feasibility of this solution. In addition, statuses of data and PCRS receiving and sending between the eNB and the UE may be determined by using the port indication information, to improve accuracy and reliability of this solution.

With reference to the second possible implementation of the second aspect of the embodiments of this application, in a third possible implementation, that the UE receives the port indication information sent by the eNB may specifically include:

the eNB may send a port number of at least one PCRS port in the second PCRS port set to the target UE, and then the target UE determines the at least one PCRS port in the second PCRS port set based on the port number. In other words, the port indication information is first indication information, and the eNB may add the port number of the at least one PCRS port in the second PCRS port set to the first indication information.

In this embodiment of this application, the UE determines, by using a port number, to receive the PCRS through the first PCRS port set and receive the data through the second PCRS port set. In the foregoing manner, the eNB may notify the target UE of a specific PCRS port that is corresponding to the port number and that is used to receive data, and therefore a feasible manner of determining data and PCRS receiving and sending between the eNB and the UE is provided, to improve feasibility and reliability of this solution.

With reference to the second possible implementation of the second aspect of the embodiments of this application, in a fourth possible implementation, that the UE receives the port indication information sent by the eNB may specifically include:

the eNB may send a quantity of PCRS ports in the first PCRS port set and/or a quantity of PCRS ports in the second PCRS port set to the target UE, and then the target UE may determine, based on the quantity of PCRS ports, a specific PCRS port for receiving data. In other words, the port indication information is second indication information, and the eNB may add, to the second indication information, identifier information corresponding to the quantity of PCRS ports in the first PCRS port set and/or the quantity of PCRS ports in the second PCRS port set.

In this embodiment of this application, the UE determines, through a quantity of PCRS ports, to receive the PCRS through the first PCRS port set and receive the data through the second PCRS port set. In the foregoing manner, the eNB may notify the target UE of a specific PCRS port that is corresponding to the quantity of PCRS ports and that is used to receive data and a specific PCRS port that is corresponding to the quantity of PCRS ports and that is used to receive a PCRS, and therefore a feasible manner of determining data and PCRS receiving and sending between the eNB and the UE is provided, to improve feasibility and reliability of this solution.

With reference to the second possible implementation of the second aspect of the embodiments of this application, in a fifth possible implementation, that the UE receives the port indication information sent by the eNB may specifically include:

the eNB may directly send PCRS allocation information to the target UE, namely, third indication information, and add, to the third indication information, an identifier of a PCRS allocated by the eNB to the target UE in the first PCRS port set and a first time-frequency resource element on which the PCRS is located; and after receiving the PCRS allocation information, the target UE may determine a specific first time-frequency resource element for receiving a PCRS.

Herein, it may be considered that the eNB does not need to indirectly notify, by using other attribute information, the target UE of time-frequency resource elements for transmitting a PCRS and data. Instead, the eNB directly notifies the target UE of specific data and a specific PCRS to be sent to the target UE.

In this embodiment of this application, the UE directly determines, by using the PCRS allocation information, the first time-frequency resource element used to transmit a PCRS, and the UE receives, by using the first time-frequency resource element, the PCRS sent by the eNB. In the foregoing manner, the UE can more quickly and accurately learn of a specific time-frequency resource element for receiving a PCRS, without a need to determine a mapping relationship, to save computing resources of the UE and further improve data transmission reliability.

With reference to the second aspect of the embodiments of this application, in a sixth possible implementation, that the UE receives, in the first scheduling period by using the first time-frequency resource element, the phase noise compensation pilot signal (PCRS) sent by the eNB may further specifically include the following step:

The eNB determines, based on a current channel status, a target MCS to be used for communication with the target UE, and then the eNB notifies the target UE of the to-be-used target MCS by using control signaling, that is, the target UE receives the target MCS sent by the eNB. In addition, an association relationship between an MCS and a PCRS transmission pattern is maintained on both the eNB side and the UE side. In this case, the target UE may determine, based on the notified target MCS in the control signaling, whether a PCRS is transmitted through a PCRS port. If it is determined that a PCRS is transmitted, the target UE may further determine which time-frequency resource element of which port is used to transmit the PCRS. The eNB determines, based on the target MCS, the first time-frequency resource element corresponding to the at least one port used to transmit a PCRS in the first PCRS port set, and may configure the first time-frequency resource element in advance, or may adjust the first time-frequency resource element based on an actual situation.

In this embodiment of this application, the eNB determines the corresponding first time-frequency resource element in the first PCRS port set. Specifically, the eNB may first determine the MCS, and the target MCS is used to indicate an MCS that is used by the eNB to send the data to the target UE. Then the eNB determines, based on the target MCS, the first time-frequency resource element corresponding to the at least one port used to transmit a PCRS in the first PCRS port set. In addition, the target UE may also receive, in the first scheduling period by using the first time-frequency resource element based on the target MCS determined by the eNB, the PCRS sent by the eNB. In the foregoing manner, the eNB notifies, in an implicit manner without a need to occupy additional bits in control signaling, the UE of the corresponding first time-frequency resource element used to transmit a PCRS. Based on the MCS scheduled by the eNB, the UE can learn of the first time-frequency resource element used to transmit a PCRS, to reduce overheads of the control signaling and improve efficiency of a communications system.

With reference to the sixth implementation of the second aspect of the embodiments of this application, in a seventh possible implementation, after receiving, in the first scheduling period by using the first time-frequency resource element, the phase noise compensation pilot signal (PCRS) sent by the eNB, the UE may further specifically perform the following step:

A scheduler in the eNB starts to schedule a next period, namely, a second scheduling period, and then updates the first time-frequency resource element in the second scheduling period to obtain an updated third time-frequency resource element. The eNB sends the PCRS to the UE on the third time-frequency resource element, and the eNB also sends valid data on a time-frequency resource element in the first PCRS port set other than the third time-frequency resource element.

Further, in this embodiment of this application, after the eNB determines the first time-frequency resource element corresponding to the at least one port used to transmit a PCRS in the first PCRS port set, the eNB may further update the first time-frequency resource element in the second scheduling period to obtain the updated third time-frequency resource element, and the eNB sends the PCRS on the third time-frequency resource element. In the foregoing manner, the eNB may dynamically configure a PCRS in each scheduling period, and determine a time-frequency resource element used to transmit a PCRS, to improve practicability and flexibility of this solution.

A third aspect of this application provides a base station, including:

a first determining module, configured to determine a first PCRS port set and a second PCRS port set in a first scheduling period, where the first PCRS port set includes at least one port used to transmit a PCRS, but the second PCRS port set does not include a port used to transmit a PCRS in the first scheduling period;

a second determining module, configured to determine a first time-frequency resource element corresponding to the at least one port used to transmit a PCRS in the first PCRS port set determined by the first determining module;

a first sending module, configured to: if a quantity of first time-frequency resource elements is greater than or equal to 1, send a PCRS to target UE on the first time-frequency resource element determined by the second determining module; and a second sending module, configured to send data to the target UE on a second time-frequency resource element corresponding to the second PCRS port set determined by the first determining module.

With reference to the third aspect of the embodiments of this application, in a first possible implementation, the base station may further include:

a first receiving module, configured to: after the second determining module determines the first time-frequency resource element corresponding to the at least one port used to transmit a PCRS in the first PCRS port set, receive, on the first time-frequency resource element, a PCRS sent by the target UE; and a second receiving module, configured to receive, on the second time-frequency resource element corresponding to the second PCRS port set, data sent by the target UE.

With reference to the third aspect of the embodiments of this application, in a second possible implementation, the base station may further include:

a generation module, configured to: after the first determining module determines the first PCRS port set and the second PCRS port set in the first scheduling period, generate port indication information corresponding to the first scheduling period; and a third sending module, configured to send the port indication information generated by the generation module to the target UE, where the port indication information is used by the target UE to receive the PCRS through the first PCRS port set and receive the data through the second PCRS port set.

With reference to the second possible implementation of the third aspect of the embodiments of this application, in a third possible implementation, the port indication information is first indication information; and the third sending module may include:

a first sending unit, configured to send the first indication information to the target UE, where the first indication information is used to indicate a port number of at least one PCRS port in the second PCRS port set.

With reference to the second possible implementation of the third aspect of the embodiments of this application, in a fourth possible implementation, the port indication information is second indication information; and the third sending module may include:

a second sending unit, configured to send the second indication information to the target UE, where the second indication information is used to indicate a quantity of PCRS ports in the first PCRS port set and/or a quantity of PCRS ports in the second PCRS port set.

With reference to the second possible implementation of the third aspect of the embodiments of this application, in a fifth possible implementation, the port indication information is third indication information; and the third sending module may include:

a third sending unit, configured to send the third indication information to the target user equipment, where the third indication information is used to indicate the first time-frequency resource element allocated to the target user equipment in the first PCRS port set.

With reference to the third aspect of the embodiments of this application, in a sixth possible implementation, the second determining module may include:

a first determining unit, configured to determine a target MCS, where the target MCS is used to indicate an MCS that is used by the eNB to send the data to the target UE; and a second determining unit, configured to determine, based on the target MCS determined by the first determining unit, the first time-frequency resource element corresponding to the at least one port used to transmit a PCRS in the first PCRS port set.

With reference to the third aspect of the embodiments of this application, in a seventh possible implementation, the second determining module may include:

a third determining unit, configured to determine scheduling bandwidth for sending the data to the target UE in the first scheduling period; and a fourth determining unit, configured to determine, based on the scheduling bandwidth determined by the third determining unit, the first time-frequency resource element corresponding to the at least one port used to transmit a PCRS in the first PCRS port set.

With reference to the sixth or seventh possible implementation of the third aspect of the embodiments of this application, in an eighth possible implementation, the base station may further include:

an updating module, configured to: after the second determining module determines the first time-frequency resource element corresponding to the at least one port used to transmit a PCRS in the first PCRS port set, update the first time-frequency resource element in a second scheduling period to obtain an updated third time-frequency resource element; and a fourth sending module, configured to send the PCRS on the third time-frequency resource element updated by the updating module.

A fourth aspect of this application provides user equipment, including:

a first receiving module, configured to: if a quantity of first time-frequency resource elements is greater than or equal to 1, receive, in a first scheduling period by using a first time-frequency resource element, a PCRS sent by an eNB, where the first time-frequency resource element is determined by the eNB from at least one port used to transmit a PCRS in a first PCRS port set; and a second receiving module, configured to receive, in the first scheduling period by using a second time-frequency resource element, data sent by the base station, where the second time-frequency resource element is a time-frequency resource element that is not used to transmit a PCRS in a second PCRS port set, and the second PCRS port set does not include a port used to transmit a PCRS in the first scheduling period.

With reference to the fourth aspect of the embodiments of this application, in a first possible implementation, the user equipment may further include:

a first sending module, configured to send a PCRS to the base station by using the first time-frequency resource element; and a second sending module, configured to send data to the base station by using the second time-frequency resource element.

With reference to the fourth aspect of the embodiments of this application, in a second possible implementation, the user equipment may further include:

a third receiving module, configured to: before the first receiving module receives, in the first scheduling period by using the first time-frequency resource element, the PCRS sent by the eNB, receive port indication information sent by the eNB, where the port indication information is used by the target UE to receive the PCRS through the first PCRS port set and receive the data through the second PCRS port set.

With reference to the second possible implementation of the fourth aspect of the embodiments of this application, in a third possible implementation, the port indication information is first indication information; and the third receiving module may include:

a first receiving unit, configured to receive the first indication information sent by the eNB, where the first indication information is used to indicate a port number of at least one PCRS port in the second PCRS port set.

With reference to the second possible implementation of the fourth aspect of the embodiments of this application, in a fourth possible implementation, the port indication information is second indication information; and the third receiving module may include:

a second receiving unit, configured to receive the second indication information sent by the eNB, where the second indication information is used to indicate a quantity of PCRS ports in the first PCRS port set and/or a quantity of PCRS ports in the second PCRS port set.

With reference to the second possible implementation of the fourth aspect of the embodiments of this application, in a fifth possible implementation, the port indication information is third indication information; and the third receiving module may include:

a third receiving unit, configured to receive the third indication information sent by the eNB, where the third indication information is used to indicate the first time-frequency resource element allocated by the eNB to the target UE in the first PCRS port set.

With reference to the fourth aspect of the embodiments of this application, in a sixth possible implementation, the first receiving module may include:

a fourth receiving unit, configured to receive a target MCS determined by the eNB, where the target MCS is used to indicate an MCS that is used by the eNB to send the data to the target UE; and a fifth receiving unit, configured to receive, in the first scheduling period by using the first time-frequency resource element based on the target MCS received by the fourth receiving unit, the PCRS sent by the eNB.

With reference to the sixth implementation of the fourth aspect of the embodiments of this application, in a seventh possible implementation, the user equipment may further include:

a fourth receiving module, configured to receive the PCRS on a third time-frequency resource element after the first receiving module receives, in the first scheduling period by using the first time-frequency resource element, the PCRS sent by the eNB, where the third time-frequency resource element is obtained after the eNB updates the first time-frequency resource element in a second scheduling period.

A fifth aspect of this application provides a base station, including a memory, a transceiver, a processor, and a bus system, where the memory is configured to store a program; and the processor is configured to execute the program in the memory to perform the following specific steps:

determining a first phase noise compensation pilot signal (PCRS) port set and a second PCRS port set in a first scheduling period, where the first PCRS port set includes at least one port used to transmit a PCRS, but the second PCRS port set does not include a port used to transmit a PCRS in the first scheduling period;

determining a first time-frequency resource element corresponding to the at least one port used to transmit a PCRS in the first PCRS port set;

if a quantity of first time-frequency resource elements is greater than or equal to 1, controlling the transceiver to send a PCRS to target UE on the first time-frequency resource element; and controlling the transceiver to send data to the target UE on a second time-frequency resource element corresponding to the second PCRS port set.

Optionally, the processor is further configured to perform the following steps:

controlling the transceiver to receive, on the first time-frequency resource element, a PCRS sent by the target UE; and controlling the transceiver to receive, on the second time-frequency resource element corresponding to the second PCRS port set, data sent by the target UE.

Optionally, the processor is further configured to perform the following steps:

generating port indication information corresponding to the first scheduling period; and controlling the transceiver to send the port indication information to the target UE, where the port indication information is used by the target UE to receive the PCRS through the first PCRS port set and receive the data through the second PCRS port set.

Optionally, the processor is specifically configured to perform the following step:

controlling the transceiver to send first indication information to the target UE, where the first indication information is used to indicate a port number of at least one PCRS port in the second PCRS port set.

Optionally, the processor is specifically configured to perform the following step:

controlling the transceiver to send second indication information to the target UE, where the second indication information is used to indicate a quantity of PCRS ports in the first PCRS port set and/or a quantity of PCRS ports in the second PCRS port set.

Optionally, the processor is specifically configured to perform the following step:

controlling the transceiver to send third indication information to the target UE, where the third indication information is used to indicate the first time-frequency resource element allocated to the target UE in the first PCRS port set.

Optionally, the processor is specifically configured to perform the following steps:

determining a target MCS, where the target MCS is used to indicate an MCS that is used by the base station to send the data to the target user equipment; and determining, based on the target MCS, the first time-frequency resource element corresponding to the at least one port used to transmit a PCRS in the first PCRS port set.

Optionally, the processor is specifically configured to perform the following steps:

determining scheduling bandwidth for sending the data to the target UE in the first scheduling period; and determining, based on the scheduling bandwidth, the first time-frequency resource element corresponding to the at least one port used to transmit a PCRS in the first PCRS port set.

Optionally, the processor is further configured to perform the following steps:

updating the first time-frequency resource element in a second scheduling period to obtain an updated third time-frequency resource element; and controlling the transceiver to send the PCRS on the third time-frequency resource element.

A sixth aspect of this application provides a base station, including a memory, a transceiver, a processor, and a bus system, where the memory is configured to store a program; and if a quantity of first time-frequency resource elements is greater than or equal to 1, controlling the transceiver to receive, in a first scheduling period by using a first time-frequency resource element, a PCRS sent by an eNB, where the first time-frequency resource element is determined by the eNB from at least one port used to transmit a PCRS in a first PCRS port set; and controlling the transceiver to receive, in the first scheduling period by using a second time-frequency resource element, data sent by the eNB, where the second time-frequency resource element is a time-frequency resource element that is not used to transmit a PCRS in a second PCRS port set, and the second PCRS port set does not include a port used to transmit a PCRS in the first scheduling period.

Optionally, the processor is specifically configured to perform the following steps:

controlling the transceiver to send a PCRS to the eNB by using the first time-frequency resource element; and controlling the transceiver to send data to the eNB by using the second time-frequency resource element.

Optionally, the processor is specifically configured to perform the following step:

controlling the transceiver to receive port indication information sent by the eNB, where the port indication information is used by the target UE to receive the PCRS through the first PCRS port set and receive the data through the second PCRS port set.

Optionally, the processor is specifically configured to perform the following step:

controlling the transceiver to receive first indication information sent by the eNB, where the first indication information is used to indicate a port number of at least one PCRS port in the second PCRS port set.

Optionally, the processor is specifically configured to perform the following step:

controlling the transceiver to receive second indication information sent by the eNB, where the second indication information is used to indicate a quantity of PCRS ports in the first PCRS port set and/or a quantity of PCRS ports in the second PCRS port set.

Optionally, the processor is specifically configured to perform the following step:

controlling the transceiver to receive third indication information sent by the eNB, where the third indication information is used to indicate the first time-frequency resource element allocated by the eNB to the target UE in the first PCRS port set.

Optionally, the processor is specifically configured to perform the following steps:

controlling the transceiver to receive a target MCS determined by the eNB, where the target MCS is used to indicate an MCS that is used by the eNB to send the data to the target UE; and controlling, based on the target MCS, the transceiver to receive, in the first scheduling period by using the first time-frequency resource element, the PCRS sent by the eNB.

Optionally, the processor is further configured to perform the following step:

controlling the transceiver to receive the PCRS on a third time-frequency resource element, where the third time-frequency resource element is obtained after the eNB updates the first time-frequency resource element in a second scheduling period.

A seventh aspect of this application provides a data transmission system, including a base station and user equipment.

The base station is the base station in any one of the third aspect and the first to the eighth implementations of the third aspect.

The user equipment is the user equipment in any one of the fourth aspect and the first to seventh implementations of the fourth aspect.

An eighth aspect of this application provides a phase noise estimation method, including:

determining, by an eNB, a target PCRS port set, where the target PCRS port set includes at least one port used to transmit a PCRS;

determining, by the eNB, a target time-frequency resource element from the target PCRS port set, where the target time-frequency resource element is used to transmit a PCRS;

determining, by the eNB, a first space-time-frequency resource element and a second space-time-frequency resource element based on the target time-frequency resource element, where neither the first space-time-frequency resource element nor the second space-time-frequency resource element is used to send a signal;

determining, by the eNB, a first phase noise estimation value based on the first space-time-frequency resource element and the target time-frequency resource element, and determining a second phase noise estimation value based on the second space-time-frequency resource element and the target time-frequency resource element; and determining, by the eNB, a noise estimation result based on the first phase noise estimation value and the second phase noise estimation value.

In this embodiment of this application, no signal is sent on a time-frequency resource element adjacent to the target time-frequency resource element, and only ICI of one space-time-frequency resource element adjacent to the target time-frequency resource element is received based on the target time-frequency resource element, so that phase noise of the ICI can be accurately deduced, to compensate for the ICI. This improves data transmission accuracy and reduces difficulty in demodulating data by a terminal.

Optionally, both the first space-time-frequency resource element and the second space-time-frequency resource element are time-frequency resource elements adjacent to the target time-frequency resource element, and the first space-time-frequency resource element, the second space-time-frequency resource element, and the target time-frequency resource element are separately located on different PCRS ports.

It can be learned from the foregoing technical solutions that the embodiments of this application have the following advantages:

The embodiments of this application provide a data transmission method. The eNB first determines the first PCRS port set and the second PCRS port set in the first scheduling period, where the first PCRS port set includes the at least one port used to transmit a PCRS, but the second PCRS port set does not include a port used to transmit a PCRS in the first scheduling period; then the eNB determines the first time-frequency resource element corresponding to the at least one port used to transmit a PCRS in the first PCRS port set; and the eNB sends the PCRS to the target UE on the first time-frequency resource element, and sends the data to the target UE on the second time-frequency resource element corresponding to the second PCRS port set. In the foregoing manner, in a scheduling period, the eNB determines the first time-frequency resource element used to transmit a PCRS, and valid data may be transmitted on all remaining time-frequency resource elements that are not used to transmit a PCRS, to improve PCRS port data transmission efficiency and effectively save PCRS port resources.

DESCRIPTION OF EMBODIMENTS

Embodiments of this application provide a data transmission method, a related apparatus, and a system. In a scheduling period, a first time-frequency resource element used to transmit a PCRS may be determined, and valid data may be transmitted on all remaining time-frequency resource elements that are not used to transmit a PCRS, to improve PCRS port data transmission efficiency and effectively save PCRS port resources.

In the specification, claims, and accompanying drawings of this application, the terms "first", "second", "third", "fourth", and so on (if any) are intended to distinguish between similar objects but do not necessarily indicate a specific order or sequence. It should be understood that the data termed in such a way are interchangeable in proper circumstances so that the embodiments of this application described herein can be, for example, implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

It should be understood that, the technical solutions in the embodiments of this application can be applied to various communications systems, such as a Global System for Mobile Communications (GSM), a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, an LTE time division duplex (TDD), a Universal Mobile Telecommunications System (UMTS), and a Worldwide Interoperability for Microwave Access (WiMAX) communications system.

Figures 1A, 1B:
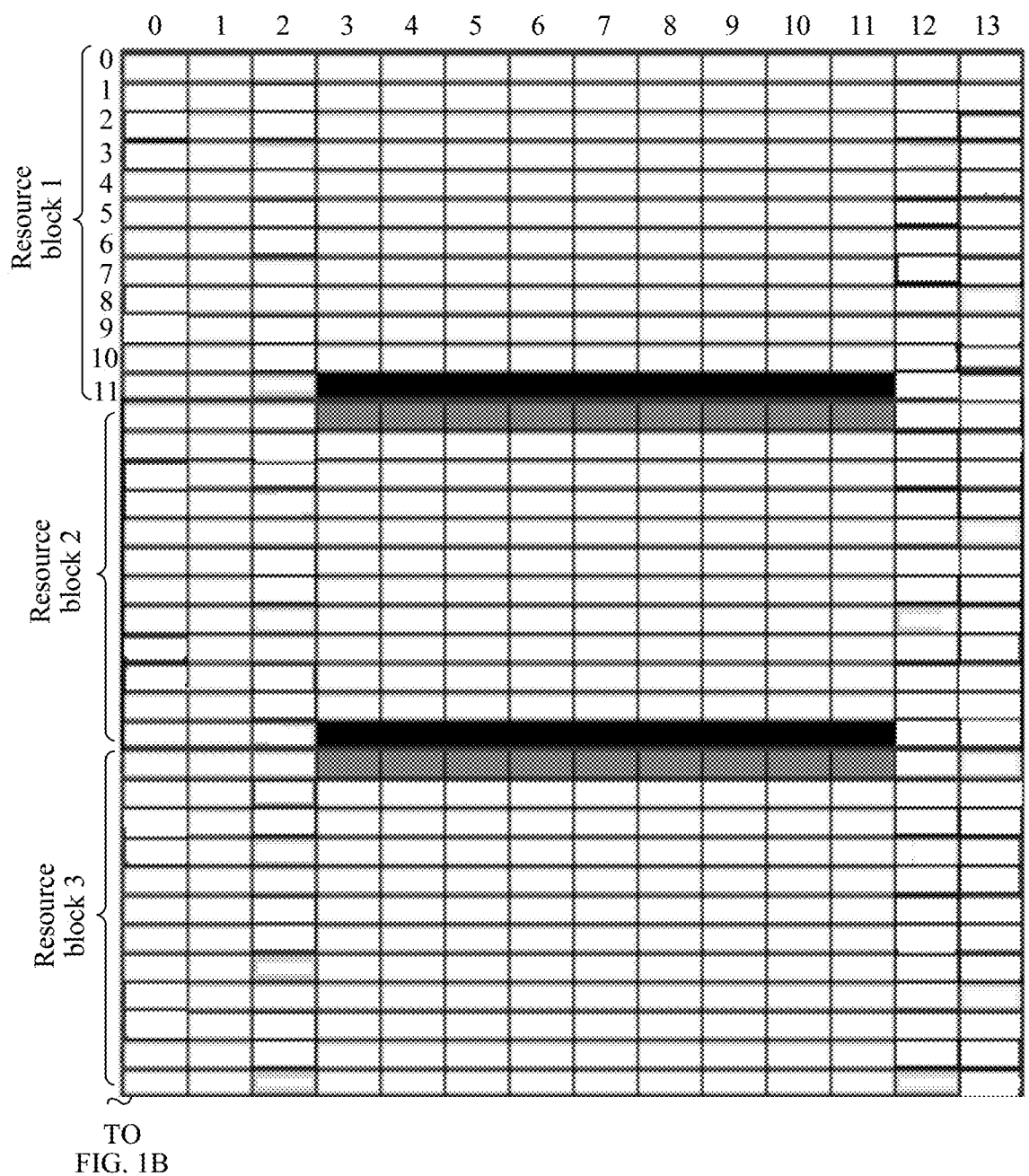
FIG. 1A and FIG. 1B are a schematic diagram of a phase noise compensation reference signal in the prior art.
Figure 1B:
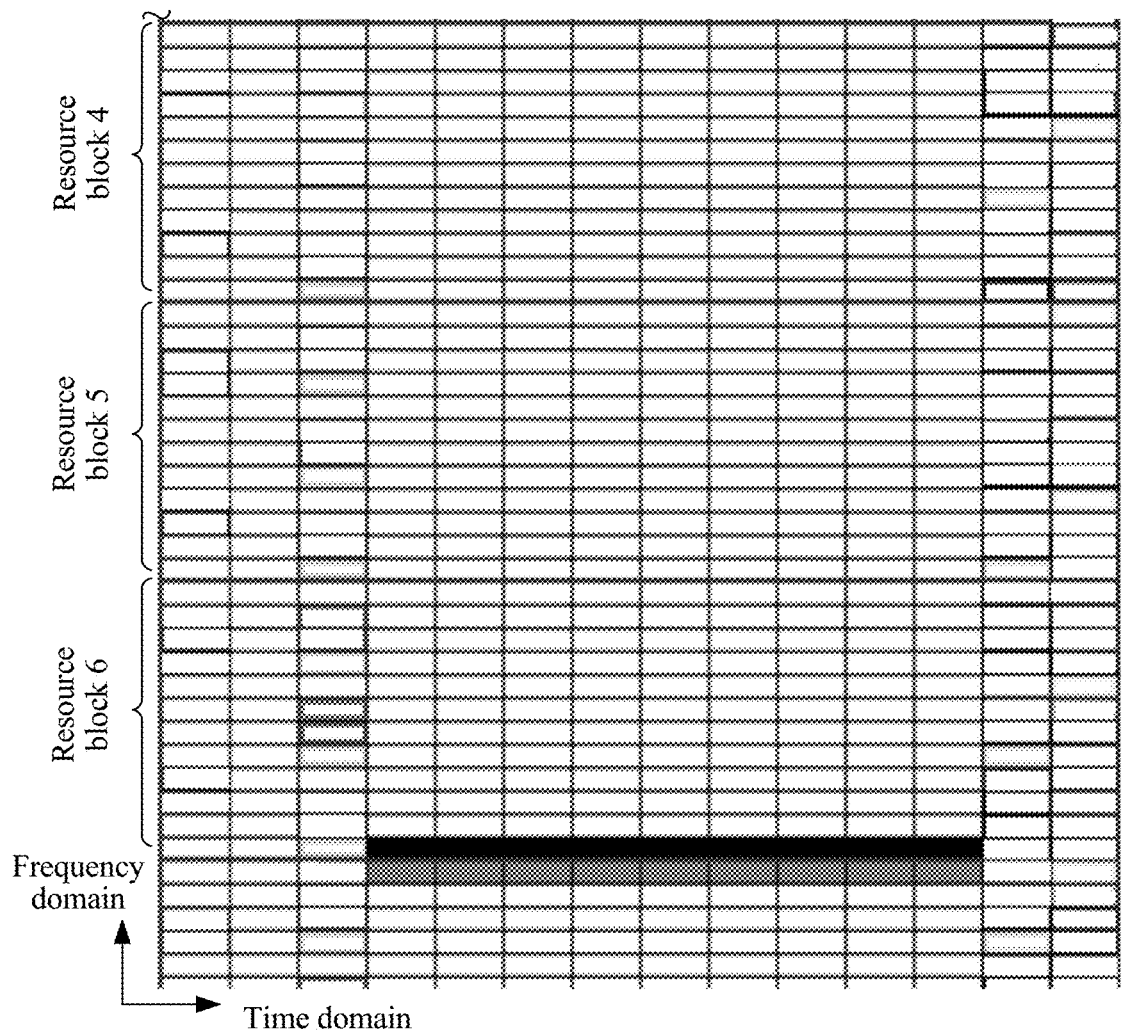
Figure 2:
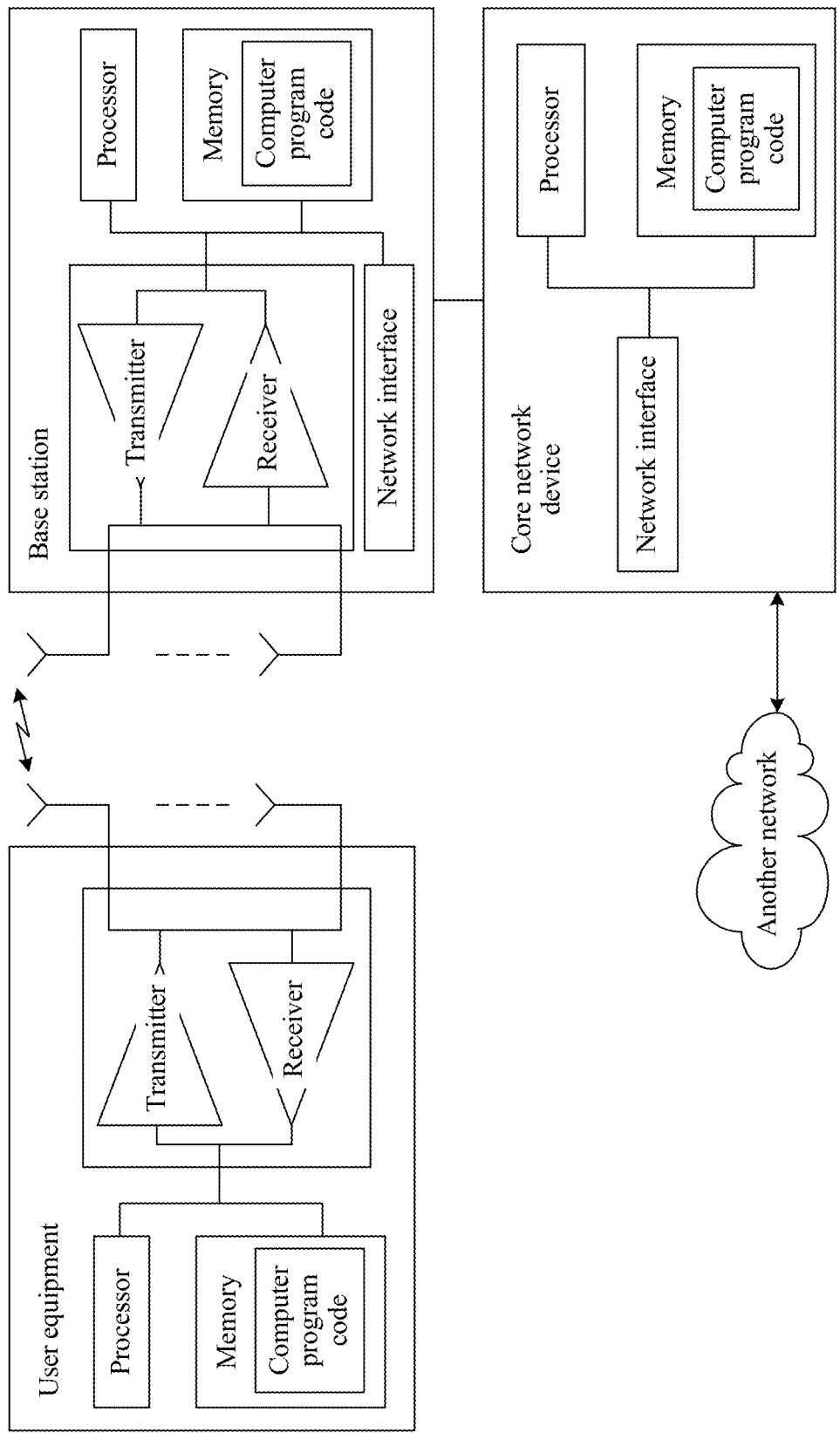
FIG. 2 is a schematic diagram of an architecture of a data transmission system according to an embodiment of this application.

It should be understood that this application can be specifically applied to a data transmission system shown in FIG. 2, and specific internal structures of all network elements included in the system are embodied. It should be noted that an internal structure of each network element in this embodiment is merely an example, and should not be construed as a limitation on the transmission system.

UE performs wireless communication with an eNB through a link. The UE includes one or more processors, one or more memories, and one or more transceivers (each transceiver includes a transmitter and a receiver), and the processor, the memory, and the transceiver are connected by using a bus. The one or more transceivers are connected to one or more antennas. The one or more memories include computer program code.

The eNB provides wireless access of the UE to a network. The eNB includes one or more processors, one or more memories, one or more network interfaces, and one or more transceivers (each transceiver includes a receiver and a transmitter), and the processor, the memory, the network interface, and the transceiver are connected by using a bus. The one or more transceivers are connected to an antenna or an antenna array. The one or more processors include computer program code. The network interface is connected to a core network by using a link (for example, a link between the network interface and the core network), or is connected to another eNB by using a wired or wireless link.

The network may further include a core network device, such as a network control unit, a mobility management entity (MME), or a serving gateway (SGW), and may further provide a network connection, such as a telephone network and/or a data communications network (for example, the Internet). The eNB may be connected to the core network device by using a link (for example, an Si interface). The core network device includes one or more processors, one or more memories, and one or more network interfaces, and the processor, the memory, and the network interface are connected by using a bus. The one or more memories include computer program code.

The memories included in the UE, the eNB, and the core network device may be suitable for any local technology environment, and may be implemented by using any proper data storage technology.

A phase of an output signal randomly changes when various radio frequency components in the UE, the eNB, and the core network device are affected by noise, resulting in difficulty in signal demodulation. To improve wireless system utilization and combat radio channel fading in a communications system, a plurality of modulation and coding schemes (MCS) may be set, so that the plurality of modulation and coding schemes can be adapted to different signal to interference plus noise ratios (SINR). However, phase noise in different MCSs has different impact. For a lower MCS such as an MCS of quadrature phase shift keying (QPSK), phase noise has little impact, and therefore compensation for phase noise is not required. For an intermediate MCS such as an MCS of 16 quadrature amplitude modulation (QAM), impact of phase noise is mainly a CPE, and therefore only the CPE is compensated for. For higher MCSs such as an MCS of 64QAM and an MCS of 256QAM, both a CPE and a part of ICI need to be compensated for to ensure demodulation performance, and therefore a PCRS may not always be sent.

However, in a scheduling period, in a process in which the eNB sends a PCRS to the UE, a port that may not need to be used to send a PCRS is idle or is used to send a PCRS, resulting in low efficiency of sending valid data. The following provides the solutions of this application to specifically describe how to increase efficiency of sending valid data.

Figure 3:
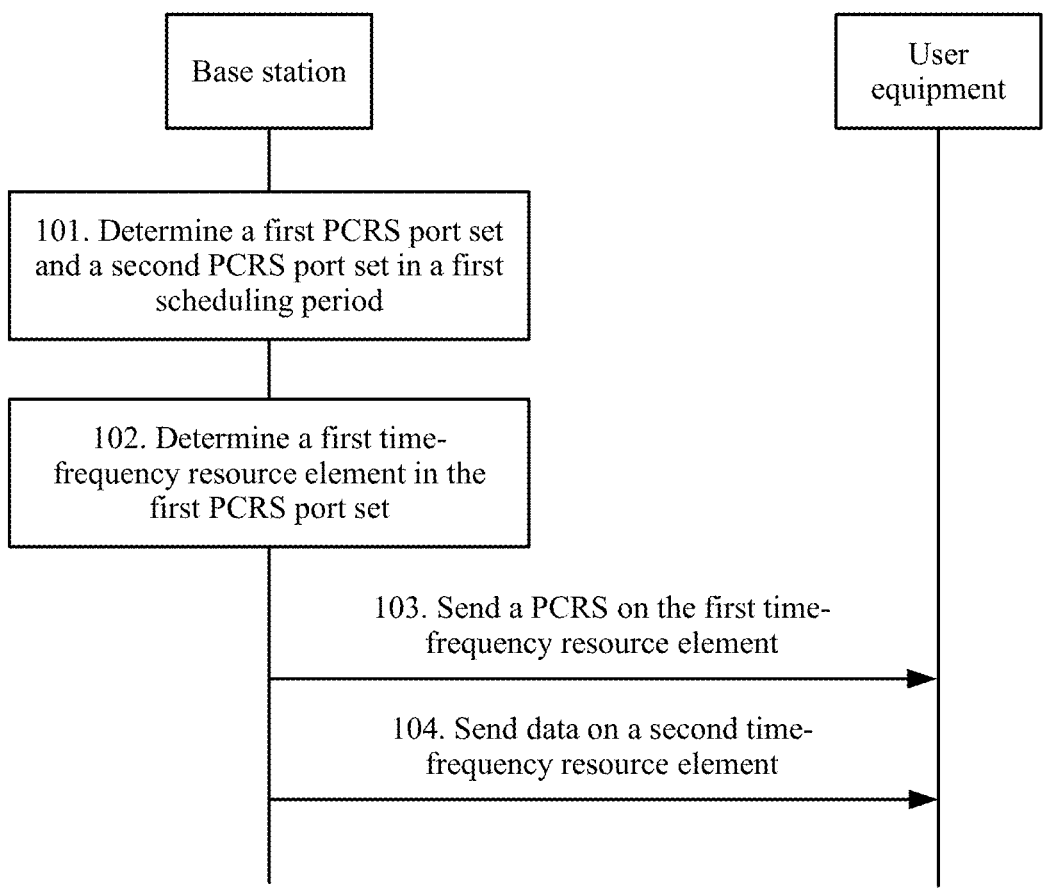
FIG. 3 is a schematic diagram of an embodiment of a data transmission method according to an embodiment of this application.

Referring to FIG. 3, an embodiment of a data transmission method in an embodiment of this application includes the following steps.

101. An eNB determines a first PCRS port set and a second PCRS port set in a first scheduling period, where the first PCRS port set includes at least one port used to transmit a PCRS, but the second PCRS port set does not include a port used to transmit a PCRS in the first scheduling period.

In this embodiment, the eNB first determines the first PCRS port set and the second PCRS port set in the first scheduling period, and the first scheduling period is determined by a scheduler in the eNB. The scheduler is mainly responsible for scheduling various system resources for different UE at different time points, and working efficiency and actual performance of the eNB directly depend on a design of the scheduler. A plurality of factors need to be considered during working of the scheduler, such as channel quality at a location of UE, a UE buffer status, an eNB system resource status, a service priority, and a user priority, and a proper scheduling algorithm is used to maximize system resource utilization, to ensure as optimal user experience as possible.

It may be understood that the second PCRS port set may include a null set.

In addition, a PCRS in this application may also be referred to as a phase tracking reference signal (PTRS) or another reference signal. Herein, the PCRS is used as an example for description, but this should not be construed as a limitation on this solution.

Three main scheduling algorithms are currently used in a communications system: a round robin algorithm, a maximum carrier-to-interference ratio algorithm, and a proportional fairness algorithm. It should be noted that a specific scheduling algorithm for determining the first scheduling period is not limited in this solution.

In addition, the first PCRS port set includes the at least one port used to transmit a PCRS, and a PCRS is used to perform phase noise estimation and compensation. However, the second PCRS port set does not include a port used to transmit a PCRS in the first scheduling period. In other words, a PCRS port in the second PCRS port set is not used to transmit a PCRS.

102. The eNB determines a first time-frequency resource element corresponding to the at least one port used to transmit a PCRS in the first PCRS port set.

In this embodiment, the eNB further needs to determine the first time-frequency resource element used to transmit a PCRS in the first PCRS port set, and the first time-frequency resource element includes at least one time-frequency resource element.

In time domain, a finest resource granularity is one OFDM symbol, and in frequency domain, a finest granularity is one subcarrier. A time-frequency resource element including one OFDM symbol and one subcarrier is also referred to as a resource element (RE). An RE is a basic unit in resource mapping at a physical layer. All OFDM symbols in one timeslot and 12 subcarriers in frequency domain form one resource block (RB), and an RB is a basic unit in Long Term Evolution (LTE) resource scheduling.

103. If a quantity of first time-frequency resource elements is greater than or equal to 1, the eNB sends a PCRS to target UE on the first time-frequency resource element, and the target UE receives, in the first scheduling period by using the first time-frequency resource element, the PCRS sent by the eNB.

In this embodiment, if the quantity of first time-frequency resource elements determined by the eNB is greater than or equal to 1, the eNB sends a PCRS used for signal compensation to the target UE on the first time-frequency resource element. PCRS transmission is performed by using a time-frequency resource element as a smallest unit. Valid data may be transmitted on all remaining time-frequency resource elements in the first PCRS port set.

If quantity of the first time-frequency resource element determined by the eNB is 0, it indicates that the eNB sends no PCRS to the target UE in the first scheduling period, and therefore may send data on each time-frequency resource element in the first PCRS port set and the second PCRS port set.

104. The eNB sends data to the target UE on a second time-frequency resource element corresponding to the second PCRS port set, so that the target UE receives, in the first scheduling period by using the second time-frequency resource element, the data sent by the eNB.

In this embodiment, the eNB sends the data to the target UE on the second time-frequency resource element corresponding to the second PCRS port set, and the target UE may receive the data in the first scheduling period. In actual application, the base station may send data on the second time-frequency resource element corresponding to the second PCRS port set, and may further send data on an RB corresponding to the second PCRS port set.

It should be noted that a sequence of performing step 103 and step 104 is not limited herein, and step 103 may be performed before step 104, or step 103 may be performed after step 104.

This embodiment of this application provides a data transmission method. The eNB first determines the first PCRS port set and the second PCRS port set in the first scheduling period, where the first PCRS port set includes the at least one port used to transmit a PCRS, but the second PCRS port set does not include a port used to transmit a PCRS in the first scheduling period; then the eNB determines the first time-frequency resource element corresponding to the at least one port used to transmit a PCRS in the first PCRS port set; and the eNB sends the PCRS to the target UE on the first time-frequency resource element, and sends the data to the target UE on the second time-frequency resource element corresponding to the second PCRS port set. In the foregoing manner, in a scheduling period, the eNB determines the first time-frequency resource element used to transmit a PCRS, and valid data may be transmitted on all remaining time-frequency resource elements that are not used to transmit a PCRS, to improve PCRS port data transmission efficiency and effectively save PCRS port resources.

Optionally, based on the embodiment corresponding to FIG. 3, in a first optional embodiment of the data transmission method provided in the embodiments of this application, after the eNB determines the first time-frequency resource element corresponding to the at least one port used to transmit a PCRS in the first PCRS port set, the method may further include:

the eNB receives, on the first time-frequency resource element, a PCRS sent by the target UE; and the eNB receives, on the second time-frequency resource element corresponding to the second PCRS port set, data sent by the target UE.

In this embodiment, in addition to uplink data receiving and sending, downlink data receiving and sending may be performed between the eNB and the UE. In other words, the target UE may send a PCRS to the eNB on the first time-frequency resource element, and send data to the eNB on the second time-frequency resource element.

In this embodiment of this application, the eNB may receive, by using the first time-frequency resource element, the PCRS sent by the target UE, and may further send the PCRS to the target UE by using the first time-frequency resource element. Similarly, the eNB receives, by using the second time-frequency resource element, the data sent by the target UE, and may further send the data to the target UE by using the second time-frequency resource element. In the foregoing manner, integrity of uplink data transmission and downlink data transmission is ensured, thereby improving practicability of this solution.

Optionally, based on the embodiment corresponding to FIG. 3, in a second optional embodiment of the data transmission method provided in the embodiments of this application, after the eNB determines the first PCRS port set and the second PCRS port set in the first scheduling period, the method may further include:

the eNB generates port indication information corresponding to the first scheduling period;

the eNB sends the port indication information to the target UE; and the target UE determines, according to the port indication information sent by the eNB, to receive the PCRS through the first PCRS port set and receive the data through the second PCRS port set.

In this embodiment, after determining the first PCRS port set and the second PCRS port set in the first scheduling period, the eNB may further generate the port indication information corresponding to the first scheduling period, and the eNB may send the port indication information to the target UE by using downlink control information (DCI). The DCI is carried on a physical downlink control channel (PDCCH). In addition to the port indication information, DCI sent by the eNB to the target UE may include uplink/downlink resource allocation, hybrid automatic repeat request (HARQ) information, power control, and the like.

After receiving the port indication information, the target UE may determine, based on content indicated by the information, that the PCRS needs to be received through the first PCRS port set and the data needs to be received through the second PCRS port set.

In this embodiment of this application, after the eNB determines the first PCRS port set and the second PCRS port set in the first scheduling period, the eNB generates the port indication information corresponding to the first scheduling period, and then sends the port indication information to the target UE, so that the target UE determines, according to the port indication information, to receive the PCRS through the first PCRS port set and receive the data through the second PCRS port set. In the foregoing manner, the eNB may use the port indication information to notify the UE of a specific PCRS port for receiving data, to ensure feasibility of this solution. In addition, statuses of data and PCRS receiving and sending between the eNB and the UE may be determined by using the port indication information, to improve accuracy and reliability of this solution.

For ease of understanding, the following describes in detail a data transmission method in this application by using three specific application scenarios, and details are as follows:

1. Indicate data and PCRS receiving and sending by using a port number

Optionally, based on the second embodiment corresponding to FIG. 3, in a third optional embodiment of the data transmission method provided in the embodiments of this application, the port indication information is first indication information.

That the eNB sends the port indication information to the target UE may include:

the eNB sends the first indication information to the target UE, where the first indication information is used to indicate a port number of at least one PCRS port in the second PCRS port set.

In this embodiment, the eNB may send the port number of the at least one PCRS port in the second PCRS port set to the target UE, so that the target UE determines the at least one PCRS port in the second PCRS port set based on the port number.

Specifically, it is assumed that ports numbered 57, 58, 59, 60, 61 may be used to transmit a PCRS, and the five ports may be referred to as PCRS ports. The eNB allocates a PCRS to ports 60 and 61, and the ports 60 and 61 form the first PCRS port set. However, the eNB allocates no PCRS to ports 57, 58, and 59, and the three ports form the second PCRS port set. The first indication information sent by the eNB to the target UE indicates the port number of the at least one PCRS port in the second PCRS port set. To be specific, the first indication information carries identifiers corresponding to the ports 57, 58, and 59. After receiving the first indication information, the target UE obtains the identifiers of the ports 57, 58, and 59 by parsing the information, to determine that valid data is transmitted from the ports 57, 58, 59 and receive the valid data.

It may be understood that, in addition to a specific PCRS port that is corresponding to a port number and that is used to transmit data, the eNB may notify the target UE of a specific PCRS port that is corresponding to a port number and that is used to transmit a PCRS.

In this embodiment of this application, the UE determines, by using a port number, to receive the PCRS through the first PCRS port set and receive the data through the second PCRS port set. In the foregoing manner, the eNB may notify the target UE of a specific PCRS port that is corresponding to the port number and that is used to receive data, and therefore a feasible manner of determining data and PCRS receiving and sending between the eNB and the UE is provided, to improve feasibility and reliability of this solution.

1. Indicate data and PCRS receiving and sending through a quantity of PCRS ports Optionally, based on the second embodiment corresponding to FIG. 3, in a fourth optional embodiment of the data transmission method provided in the embodiments of this application, the port indication information is second indication information.

That the eNB sends the port indication information to the target UE may include:

the eNB sends the second indication information to the target UE, where the second indication information is used to indicate a quantity of PCRS ports in the first PCRS port set and/or a quantity of PCRS ports in the second PCRS port set.

In this embodiment, the eNB may send the quantity of PCRS ports in the first PCRS port set and/or the quantity of PCRS ports in the second PCRS port set to the target UE, so that the target UE determines, based on the quantity of PCRS ports, a specific PCRS port for receiving data.

Specifically, it is assumed that there are five PCRS ports in total, a PCRS is transmitted on time-frequency resource elements of two PCRS ports, and data is transmitted on time-frequency resource elements of the remaining three PCRS ports. The eNB sends the second indication information to the target UE, and the UE learns, by parsing the received second indication information, that two PCRS ports are currently used to transmit a PCRS, and the other three PCRS ports are used to transmit data. Therefore, a path for receiving data and a PCRS may be determined by using the indication information.

It should be noted that either an identifier of the quantity of PCRS ports in the first PCRS port set or an identifier of the quantity of PCRS ports in the second PCRS port set may be carried in the second indication information, or both an identifier of the quantity of PCRS ports in the first PCRS port set and an identifier of the quantity of PCRS ports in the second PCRS port set are carried in the second indication information. This is not limited herein.

In this embodiment of this application, the UE determines, through a quantity of PCRS ports, to receive the PCRS through the first PCRS port set and receive the data through the second PCRS port set. In the foregoing manner, the eNB may notify the target UE of a specific PCRS port that is corresponding to the quantity of PCRS ports and that is used to receive data and a specific PCRS port that is corresponding to the quantity of PCRS ports and that is used to receive a PCRS, and therefore a feasible manner of determining data and PCRS receiving and sending between the eNB and the UE is provided, to improve feasibility and reliability of this solution.

1. Indicate data and PCRS receiving and sending through direct notification

Optionally, based on the second embodiment corresponding to FIG. 3, in a fifth optional embodiment of the data transmission method provided in the embodiments of this application, the port indication information is third indication information.

That the eNB sends the port indication information to the target UE includes:

the eNB sends the third indication information to the target UE, where the third indication information is used to indicate the first time-frequency resource element allocated to the target UE in the first PCRS port set.

In this embodiment, the eNB may send PCRS allocation information to the target UE, namely, the third indication information, and directly add, to the third indication information, an identifier of a PCRS allocated by the eNB to the target UE in the first PCRS port set and a first time-frequency resource element on which the PCRS is located.

Specifically, it is assumed that a PCRS port numbered 58 needs to be used to transmit a PCRS in the first scheduling period, four time-frequency resource elements are occupied, and these time-frequency resource elements are first time-frequency resource elements. However, to enable the target UE to learn which time-frequency resource elements are used to transmit a PCRS, the eNB adds identifiers of the four time-frequency resource elements to the third indication information, and the identifiers may be "1", "2", "3", and "4". After receiving the third indication information, the target UE obtains, by parsing the information, the identifiers of the four time-frequency resource elements of the port 58 that are used to transmit a PCRS, and determines to receive a transmitted PCRS from the port 58 and receive valid data on a remaining time-frequency resource element that is not indicated.

In this embodiment of this application, the UE directly determines, by using the PCRS allocation information, the first time-frequency resource element used to transmit a PCRS, and the UE receives, by using the first time-frequency resource element, the PCRS sent by the eNB. In the foregoing manner, the UE can more quickly and accurately learn of a specific time-frequency resource element for receiving a PCRS, without a need to determine a mapping relationship, to save computing resources of the UE and further improve data transmission reliability.

Optionally, based on the embodiment corresponding to FIG. 3, in a sixth optional embodiment of the data transmission method provided in the embodiments of this application, that the eNB determines the first time-frequency resource element corresponding to the at least one port used to transmit a PCRS in the first PCRS port set may include:

the eNB determines a target MCS, where the target MCS is used to indicate an MCS that is used by the eNB to send the data to the target UE; and the eNB determines, based on the target MCS, the first time-frequency resource element corresponding to the at least one port used to transmit a PCRS in the first PCRS port set.

In addition, that the target UE receives, in the first scheduling period by using the first time-frequency resource element, the PCRS sent by the eNB may include:

the target UE receives the target MCS determined by the eNB; and the target UE receives, in the first scheduling period by using the first time-frequency resource element based on the target MCS, the PCRS sent by the eNB.

In this embodiment, the eNB first determines the target MCS based on a current channel status, and then the eNB notifies the target UE of the currently used target MCS by using DCI. An association relationship between an MCS and a PCRS transmission pattern is maintained on both the eNB side and the UE side. In this case, the target UE may determine, based on the notified target MCS in the DCI, whether a PCRS is transmitted through a PCRS port. If it is determined that a PCRS is transmitted, the target UE may further determine which time-frequency resource element of which port is used to transmit the PCRS.

Specifically, currently available MCSs may be first numbered. Generally, there are 29 MCSs, and different PCRS patterns may be used for the MCSs. Certainly, a same PCRS pattern may be used for a plurality of MCSs. A PCRS pattern is a first time-frequency resource element used to send a PCRS. For example, if a PCRS is transmitted on time-frequency resource elements 1 to 3 of a PCRS port 54, the time-frequency resource elements 1 to 3 form one PCRS pattern. For another example, a PCRS is transmitted on time-frequency resource elements 2 to 7 of a PCRS port 57 and time-frequency resource elements 1 to 4 of a PCRS port 58, the 10 time-frequency resource elements jointly form one PCRS pattern. For ease of understanding, the association relationship between an MCS and a PCRS pattern may be shown in Table 1:

TABLE 1

| MCS number | PCRS pattern number | PCRS pattern |
| --- | --- | --- |
| 01 | Pattern 0 | No PCRS is sent. |
| 02 | Pattern 0 | No PCRS is sent. |
| 03 | Pattern 1 | A PCRS is sent by occupying one of every 24 subcarriers. |
| 04 | Pattern 1 | A PCRS is sent by occupying one of every 24 subcarriers. |
| 05 | Pattern 1 | A PCRS is sent by occupying one of every 24 subcarriers. |
| 06 | Pattern 1 | A PCRS is sent by occupying one of every 24 subcarriers. |
| 07 | Pattern 2 | A PCRS is sent by occupying one of every 16 subcarriers. |
| 08 | Pattern 2 | A PCRS is sent by occupying one of every 16 subcarriers. |
| 09 | Pattern 2 | A PCRS is sent by occupying one of every 16 subcarriers. |
| 10 | Pattern 3 | A PCRS is sent by occupying one of every eight subcarriers. |
| 11 | Pattern 3 | A PCRS is sent by occupying one of every eight subcarriers. |
| 12 | Pattern 3 | A PCRS is sent by occupying one of every eight subcarriers. |
| 13 | Pattern 3 | A PCRS is sent by occupying one of every eight subcarriers. |
| 14 | Pattern 3 | A PCRS is sent by occupying one of every eight subcarriers. |
| 15 | Pattern 3 | A PCRS is sent by occupying one of every eight subcarriers. |
| 16 | Pattern 4 | A PCRS is sent by occupying one of every four subcarriers |
| 17 | Pattern 4 | A PCRS is sent by occupying one of every four subcarriers. |
| 18 | Pattern 4 | A PCRS is sent by occupying one of every four subcarriers. |
| 19 | Pattern 4 | A PCRS is sent by occupying one of every four subcarriers. |
| 20 | Pattern 4 | A PCRS is sent by occupying one of every four subcarriers. |

As shown in the foregoing table, time-frequency resource elements corresponding to different PCRS patterns may differ in a location, density, and a quantity. For example, in the PCRS pattern 1, one of every 24 subcarriers may be occupied; in the PCRS pattern 2, one of every 16 subcarriers may be occupied; and so on. If the eNB uses an MCS-15, the eNB sends a PCRS on four PCRS ports corresponding to the pattern 4. Which time-frequency resource elements of the four PCRS ports are used to send a PCRS are not specifically limited herein. In actual application, a specific time-frequency resource element for sending a PCRS may be shown in a PCRS pattern.

However, it may be understood that the foregoing table is merely an example, a quantity of PCRS pattern types is not limited to four, and a quantity of MCS levels determined by the eNB is not limited to 20.

It should be noted that the eNB may notify the target UE of the determined target MCS by using higher layer signaling such as RRC signaling or medium access control (MAC) signaling, or directly notify the target UE of the used target MCS through preconfiguration. In actual application, the eNB notifies the target UE of the target MCS in another manner, and this is not limited herein.

In this embodiment of this application, the eNB determines the corresponding first time-frequency resource element in the first PCRS port set. Specifically, the eNB may first determine the MCS, and the target MCS is used to indicate an MCS that is used by the eNB to send the data to the target UE. Then the eNB determines, based on the target MCS, the first time-frequency resource element corresponding to the at least one port used to transmit a PCRS in the first PCRS port set. In addition, the target UE may also receive, in the first scheduling period by using the first time-frequency resource element based on the target MCS determined by the eNB, the PCRS sent by the eNB. In the foregoing manner, the eNB notifies, in an implicit manner without a need to occupy additional bits in control signaling, the UE of the corresponding first time-frequency resource element used to transmit a PCRS. Based on the MCS scheduled by the eNB, the UE can learn of the first time-frequency resource element used to transmit a PCRS, to reduce overheads of the control signaling and improve efficiency of a communications system.

Optionally, based on the embodiment corresponding to FIG. 3, in a seventh optional embodiment of the data transmission method provided in the embodiments of this application, that the eNB determines the first time-frequency resource element corresponding to the at least one port used to transmit a PCRS in the first PCRS port set may include:

the eNB determines scheduling bandwidth for sending the data to the target UE in the first scheduling period; and the eNB determines, based on the scheduling bandwidth, the first time-frequency resource element corresponding to the at least one port used to transmit a PCRS in the first PCRS port set.

In this embodiment, the eNB may detect, in the first scheduling period, the scheduling bandwidth for sending the data to the target UE, and the eNB determines, based on the determined scheduling bandwidth, the first time-frequency resource element used to transmit a PCRS. If the scheduling bandwidth is wider, the eNB can transmit a larger amount of data to the target UE in a unit time, interference between signals may increase, and therefore a quantity of PCRSs to be transmitted in a scheduling period can be increased. In this case, the first time-frequency resource element corresponding to the at least one port used to transmit a PCRS in the first PCRS port set is determined. If the scheduling bandwidth is narrower, the eNB can transmit a smaller amount of data to the target UE in a unit time, interference between signals may decrease, and therefore a quantity of PCRSs to be transmitted in a scheduling period can be reduced. In this case, the first time-frequency resource element corresponding to the at least one port used to transmit a PCRS in the first PCRS port set is determined.

In this embodiment of this application, the eNB determines the corresponding first time-frequency resource element in the first PCRS port set. Specifically, the eNB may first determine the scheduling bandwidth for sending the data to the target UE in the first scheduling period, and then the eNB determines, based on the scheduling bandwidth, the first time-frequency resource element corresponding to the at least one port used to transmit a PCRS in the first PCRS port set. In the foregoing manner, the eNB may determine the first time-frequency resource element based on the scheduling bandwidth, to improve practicability and operability of this solution.

Optionally, based on the sixth or seventh embodiment corresponding to FIG. 3, in an eighth optional embodiment of the data transmission method provided in the embodiments of this application, after the eNB determines the first time-frequency resource element corresponding to the at least one port used to transmit a PCRS in the first PCRS port set, the method may further include:

the eNB updates the first time-frequency resource element in a second scheduling period to obtain an updated third time-frequency resource element; and the eNB sends the PCRS on the third time-frequency resource element, so that the UE receives the PCRS on the third time-frequency resource element.

In this embodiment, after the eNB determines the first time-frequency resource element used to transmit a PCRS in the first scheduling period, the scheduler in the eNB starts to schedule a next period, namely, the second scheduling period.

Specifically, the eNB determines, in the second scheduling period, which PCRS port is used to transmit a PCRS and which PCRS port is used to transmit data, and further determines which time-frequency resource element of a PCRS transmission port is used to transmit a PCRS. Because an SINR in each scheduling period may vary, the eNB needs to determine a PCRS configuration based on an actual situation. In this case, a time-frequency resource element occupied during each time of PCRS sending may differ, and the eNB needs to perform PCRS configuration in different scheduling periods.

It is assumed that the eNB sends a PCRS by using time-frequency resource elements 1 to 5 of a port 58 in the first scheduling period. Because an SINR increases in the second scheduling period, the eNB also adds a time-frequency resource element used to transmit a PCRS, that is, the updated third time-frequency resource element. Specifically, a PCRS may be sent by using time-frequency resource elements 1 to 7 of the port 58, and the UE may also receive a PCRS on the time-frequency resource elements 1 to 7. A remaining time-frequency resource element that is of the PCRS port but that is not used to transmit a PCRS is still used to transmit valid data.

Further, in this embodiment of this application, after the eNB determines the first time-frequency resource element corresponding to the at least one port used to transmit a PCRS in the first PCRS port set, the eNB may further update the first time-frequency resource element in the second scheduling period to obtain the updated third time-frequency resource element, and the eNB sends the PCRS on the third time-frequency resource element. In the foregoing manner, the eNB may dynamically configure a PCRS in each scheduling period, and determine a time-frequency resource element used to transmit a PCRS, to improve practicability and flexibility of this solution.

However, a method for improving data transmission efficiency is disclosed in the foregoing method. In the following solution, how to perform ICI estimation in the data transmission system is further described.

Specifically, the eNB first determines a target PCRS port set. The target PCRS port set includes at least one port used to transmit a PCRS, that is, the at least one PCRS port is used to transmit a PCRS in a scheduling period. Each PCRS port corresponds to several time-frequency resource elements.

Then, the eNB determines a target time-frequency resource element from the target PCRS port set, and transmits a PCRS on the target time-frequency resource element. In addition, a remaining time-frequency resource element in the target PCRS port set may be still used to transmit valid data.

Subsequently, based on the target time-frequency resource element, the eNB performs suppression processing on a time-frequency resource element that is corresponding to a PCRS port adjacent to the target time-frequency resource element, and suppression processing is performing no data sending. In other words, if a PCRS is sent on time-frequency resource elements 1 to 3 of a current port 60, time-frequency resource elements 1 to 3 of a port 59 and time-frequency resource elements 1 to 3 of a port 61 are adjacent to the time-frequency resource elements 1 to 3 of the current port 60 port. Two adjacent groups of space-time-frequency resource elements may be separately obtained after the suppression processing, and may be separately defined as a first space-time-frequency resource element and a second space-time-frequency resource element.

The eNB obtains a first phase noise estimation value through calculation based on the first space-time-frequency resource element and the target time-frequency resource element, and obtains a second phase noise estimation value through calculation based on the second space-time-frequency resource element and the target time-frequency resource element. Finally, the eNB obtains an ICI noise estimation result based on the first phase noise estimation value and the second phase noise estimation value.

In this embodiment of this application, no signal is sent on a time-frequency resource element adjacent to the target time-frequency resource element, and only ICI of one space-time-frequency resource element adjacent to the target time-frequency resource element is received based on the target time-frequency resource element, so that phase noise of the ICI can be accurately deduced, to compensate for the ICI. This improves data transmission accuracy and reduces difficulty in demodulating data by a terminal.

Figure 4A:
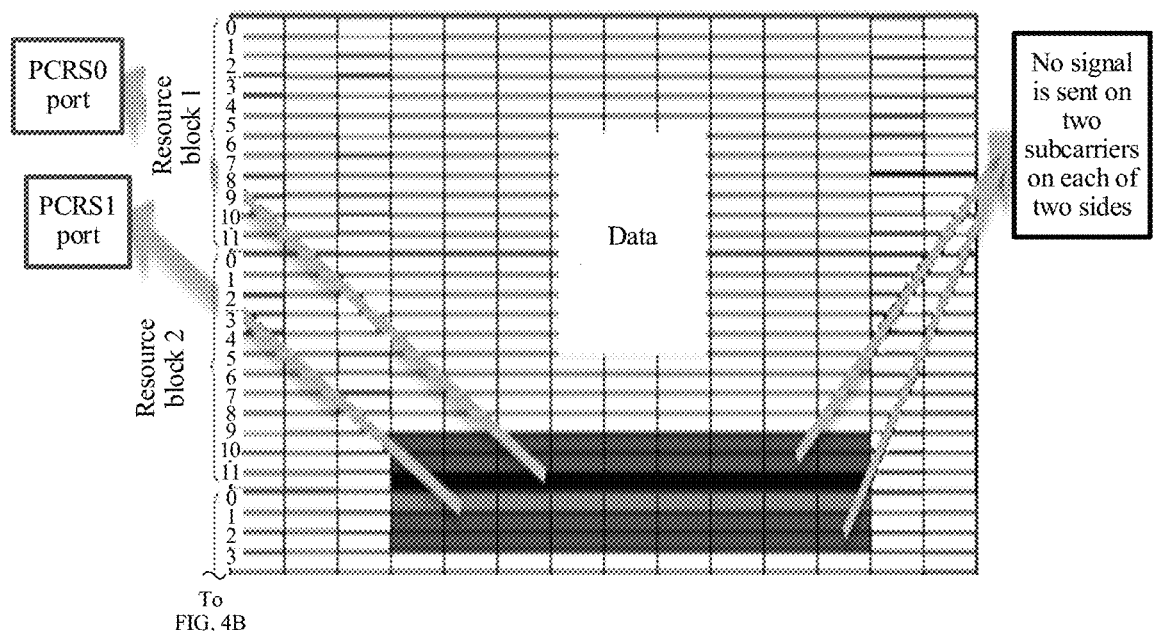
FIG. 4A and FIG. 4B are a schematic diagram of an enhanced phase noise compensation reference signal according to an embodiment of this application.
Figure 4B:
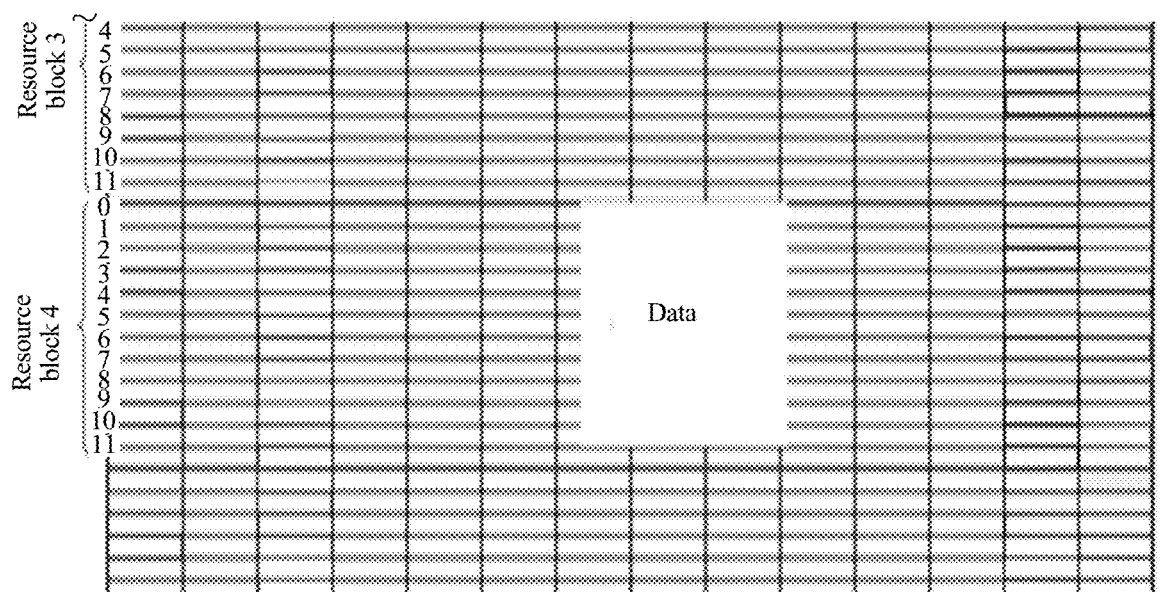

Optionally, based on the embodiments described above, for ease of understanding, reference may be further made to FIG. 4A and FIG. 4B. FIG. 4A and FIG. 4B are a schematic diagram of an enhanced phase noise compensation reference signal according to an embodiment of this application. It should be noted that, FIG. 4A and FIG. 4B are merely a schematic diagram, and shall not be construed as a limitation on this application. Both a PCRS 0 port and a PCRS 1 port in the figure are used to send a PCRS. To estimate ICI, suppression processing may be performed on subcarriers adjacent to subcarriers of the PCRS 0 port and the PCRS 1 port.

Therefore, the eNB separately performs suppression processing on the subcarriers adjacent to the subcarriers of the PCRS 0 port and the PCRS 1 port. To reduce signal interference between subcarriers, the eNB may separately suppress two upper subcarriers and two lower subcarriers. If excessive subcarriers or time-frequency resource elements are suppressed, data transmission efficiency is reduced, because a subcarrier or time-frequency resource element obtained after the suppression processing cannot be used to transmit data.

It should be noted that, for a PCRS pattern corresponding to the target time-frequency resource element in this embodiment, refer to the content of Table 1, and for the association relationship between an MCS and a PCRS pattern, also refer to Table 1. Details are not described herein again.

If no null subcarrier is reserved, it is assumed that each subcarrier has interference to only an upper adjacent subcarrier and a lower adjacent subcarrier, and a signal received on any time-frequency resource element may be represented as:

$$R(0)=X(0)H(0)J(0)+X(-1)H(-1)J(-1)+X(1)H(1)J(1)$$

X(0) is a pilot symbol on a current time-frequency resource element, H(0) is a corresponding channel, and J(0) is impact caused by phase noise; X(−1) is a pilot symbol on an upper adjacent time-frequency resource element of the current time-frequency resource element in frequency domain, and j(−1) is impact of an upper adjacent pilot symbol on a current symbol due to phase noise; and X(1) is a pilot symbol on a lower adjacent time-frequency resource element.

In this configuration, J(−1) and J(1) cannot be estimated, and J(0) is estimated approximately only by assuming that J(−1) and J(1) are 0.

When both an upper adjacent subcarrier and a lower adjacent subcarrier of a subcarrier are set to null subcarriers, a signal received on the time-frequency resource element is:

$R(0)=X(0)H(0)J(0);$ a signal received on the upper adjacent time-frequency resource element is:

$R(-1)=X(0)H(0)J(-1);$ and a signal received on the lower adjacent time-frequency resource element is:

$R(1)=X(0)H(0)J(1)$

Therefore, J(0), J(−1) and J(1) can be estimated.

Figure 5:
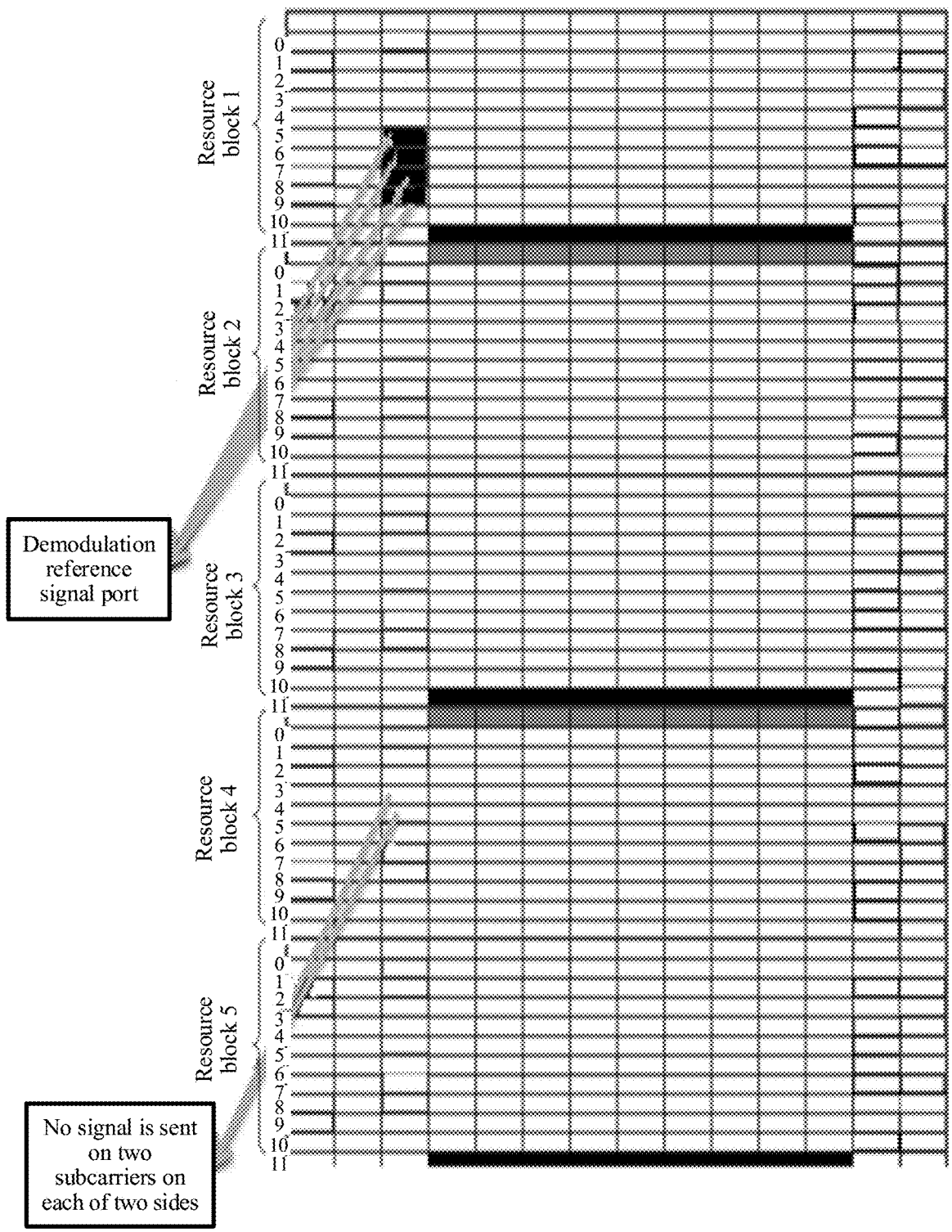
FIG. 5 is a schematic diagram of an enhanced demodulation reference signal according to an embodiment of this application.

Optionally, based on the embodiments described above, for ease of understanding, reference may be further made to FIG. 5. FIG. 5 is a schematic diagram of an enhanced demodulation reference signal according to an embodiment of this application. As shown in FIG. 5, if subcarriers n, n+1, n+2, . . . , and n+P−1 are mapped subcarriers of a demodulation reference signal (DMRS), and both n and P are set to positive integers greater than or equal to 0, subcarriers n+P, n+P+1, . . . , and n+P+N−1 are null subcarriers. In FIG. 5, a value of P is 4, and a value of N is 2, to be specific, subcarriers 1, 2, 3, and 4 are mapped subcarriers of the DMRS, and subcarriers 5 and 6 are null subcarriers.

Similarly, J(0), J(−1), and J(1) may be estimated according to the foregoing formula. ICI from another DMRS subcarrier to each DMRS pilot is reduced, so that the ICI can be effectively estimated and compensated for during channel estimation, to improve performance of the communications system.

Figure 6:
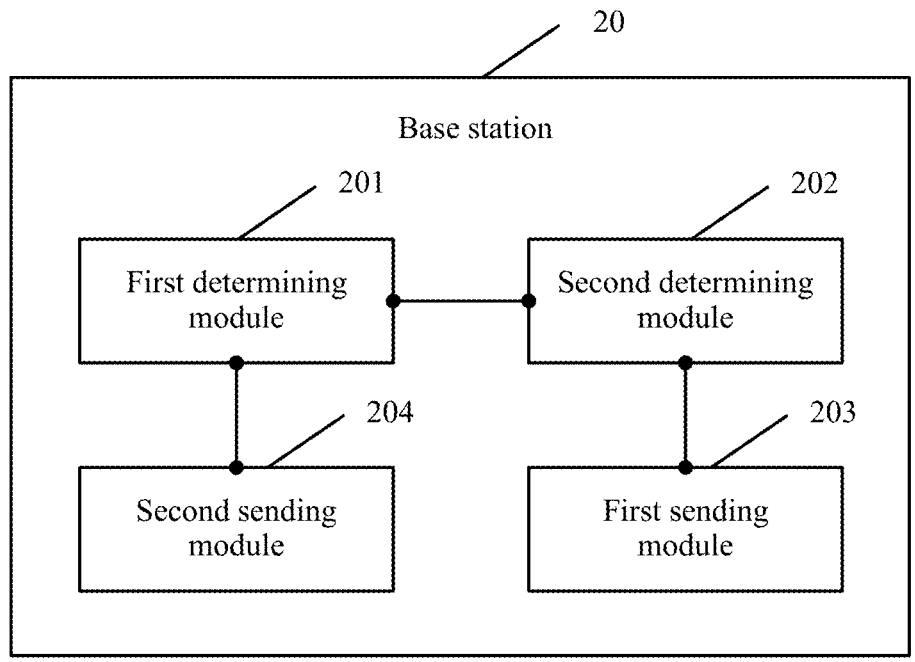
FIG. 6 is a schematic diagram of an embodiment of a base station according to an embodiment of this application.

The following describes in detail a base station in this application. Referring to FIG. 6, a base station 20 in an embodiment of this application includes:

a first determining module 201, configured to determine a first phase noise compensation pilot signal (PCRS) port set and a second PCRS port set in a first scheduling period, where the first PCRS port set includes at least one port used to transmit a PCRS, but the second PCRS port set does not include a port used to transmit a PCRS in the first scheduling period;

a second determining module 202, configured to determine a first time-frequency resource element corresponding to the at least one port used to transmit a PCRS in the first PCRS port set determined by the first determining module 201;

a first sending module 203, configured to: if a quantity of first time-frequency resource elements is greater than or equal to 1, send a PCRS to target user equipment on the first time-frequency resource element determined by the second determining module 202; and a second sending module 204, configured to send data to the target user equipment on a second time-frequency resource element corresponding to the second PCRS port set determined by the first determining module 201.

In this embodiment, the first determining module 201 determines the first phase noise compensation pilot signal (PCRS) port set and the second PCRS port set in the first scheduling period, where the first PCRS port set includes the at least one port used to transmit a PCRS, but the second PCRS port set does not include a port used to transmit a PCRS in the first scheduling period; the second determining module 202 determines the first time-frequency resource element corresponding to the at least one port used to transmit a PCRS in the first PCRS port set determined by the first determining module 201; if the quantity of first time-frequency resource elements is greater than or equal to 1, the first sending module 203 sends the PCRS to the target user equipment on the first time-frequency resource element determined by the second determining module 202; and the second sending module 204 sends the data to the target user equipment on the second time-frequency resource element corresponding to the second PCRS port set determined by the first determining module 201.

This embodiment of this application provides an eNB. The eNB first determines a first PCRS port set and a second PCRS port set in a first scheduling period, where the first PCRS port set includes at least one port used to transmit a PCRS, but the second PCRS port set does not include a port used to transmit a PCRS in the first scheduling period; then the eNB determines a first time-frequency resource element corresponding to the at least one port used to transmit a PCRS in the first PCRS port set; and the eNB sends a PCRS to target UE on the first time-frequency resource element, and sends data to the target UE on a second time-frequency resource element corresponding to the second PCRS port set. In the foregoing manner, in a scheduling period, the eNB determines the first time-frequency resource element used to transmit a PCRS, and valid data may be transmitted on all remaining time-frequency resource elements that are not used to transmit a PCRS, to improve PCRS port data transmission efficiency and effectively save PCRS port resources.

Figure 7:
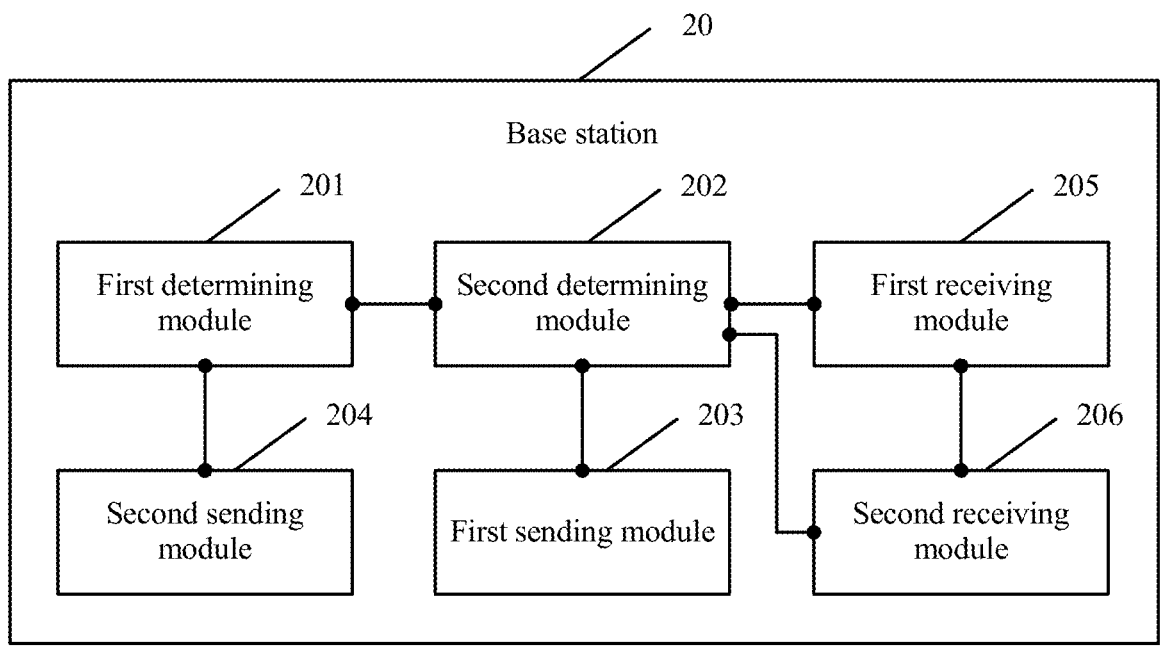
FIG. 7 is a schematic diagram of another embodiment of a base station according to an embodiment of this application.

Optionally, based on the embodiment corresponding to FIG. 6, referring to FIG. 7, in another embodiment of the base station provided in the embodiments of this application, the base station 20 further includes:

a first receiving module 205, configured to: after the second determining module 202 determines the first time-frequency resource element corresponding to the at least one port used to transmit a PCRS in the first PCRS port set, receive, on the first time-frequency resource element, a PCRS sent by the target user equipment; and a second receiving module 206, configured to receive, on the second time-frequency resource element corresponding to the second PCRS port set, data sent by the target user equipment.

In this embodiment of this application, the eNB may receive, by using the first time-frequency resource element, the PCRS sent by the target UE, and may further send the PCRS to the target UE by using the first time-frequency resource element. Similarly, the eNB receives, by using the second time-frequency resource element, the data sent by the target UE, and may further send the data to the target UE by using the second time-frequency resource element. In the foregoing manner, integrity of uplink data transmission and downlink data transmission is ensured, thereby improving practicability of this solution.

Figure 8:
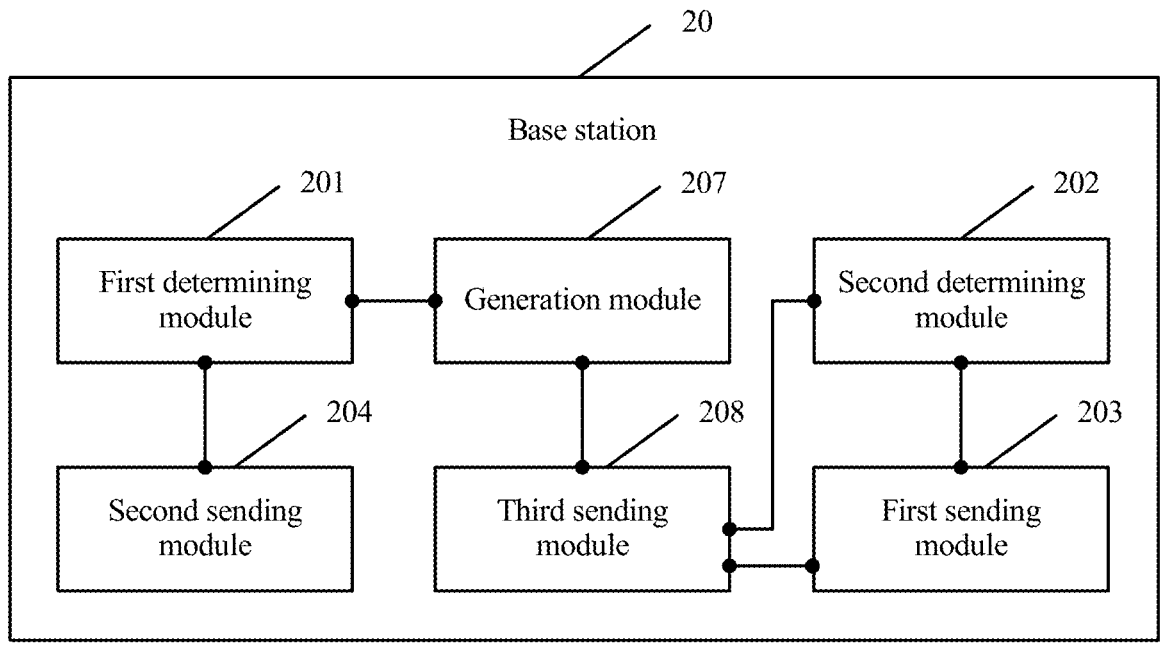
FIG. 8 is a schematic diagram of another embodiment of a base station according to an embodiment of this application.

Optionally, based on the embodiment corresponding to FIG. 6, referring to FIG. 8, in another embodiment of the base station provided in the embodiments of this application, the base station 20 further includes:

a generation module 207, configured to: after the first determining module 201 determines the first phase noise compensation pilot signal (PCRS) port set and the second PCRS port set in the first scheduling period, generate port indication information corresponding to the first scheduling period; and a third sending module 208, configured to send the port indication information generated by the generation module 207 to the target user equipment, where the port indication information is used by the target user equipment to receive the PCRS through the first PCRS port set and receive the data through the second PCRS port set.

In this embodiment of this application, after the eNB determines the first PCRS port set and the second PCRS port set in the first scheduling period, the eNB generates the port indication information corresponding to the first scheduling period, and then sends the port indication information to the target UE, so that the target UE determines, according to the port indication information, to receive the PCRS through the first PCRS port set and receive the data through the second PCRS port set. In the foregoing manner, the eNB may use the port indication information to notify the UE of a specific PCRS port for receiving data, to ensure feasibility of this solution. In addition, statuses of data and PCRS receiving and sending between the eNB and the UE may be determined by using the port indication information, to improve accuracy and reliability of this solution.

Figure 9:
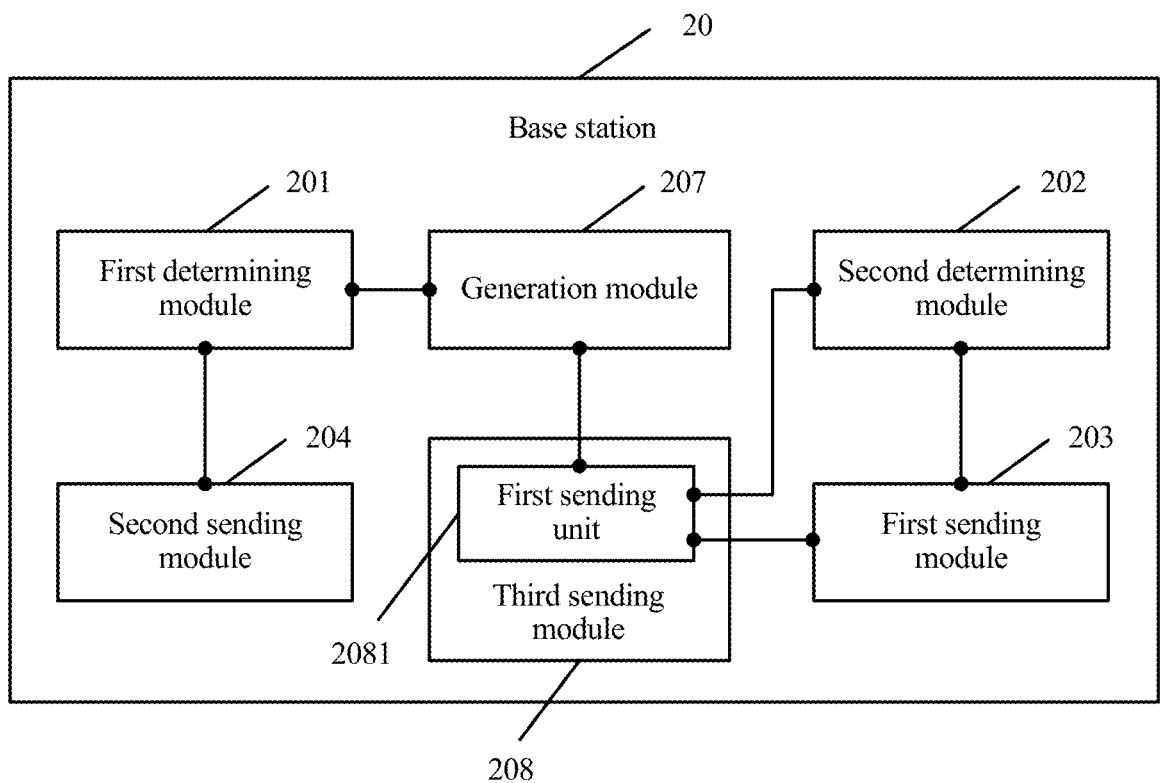
FIG. 9 is a schematic diagram of another embodiment of a base station according to an embodiment of this application.

Optionally, based on the embodiment corresponding to FIG. 8, referring to FIG. 9, in another embodiment of the base station provided in the embodiments of this application, the port indication information is first indication information; and the third sending module 208 includes:

a first sending unit 2081, configured to send the first indication information to the target user equipment, where the first indication information is used to indicate a port number of at least one PCRS port in the second PCRS port set.

In this embodiment of this application, the UE determines, by using a port number, to receive the PCRS through the first PCRS port set and receive the data through the second PCRS port set. In the foregoing manner, the eNB may notify the target UE of a specific PCRS port that is corresponding to the port number and that is used to receive data, and therefore a feasible manner of determining data and PCRS receiving and sending between the eNB and the UE is provided, to improve feasibility and reliability of this solution.

Figure 10:
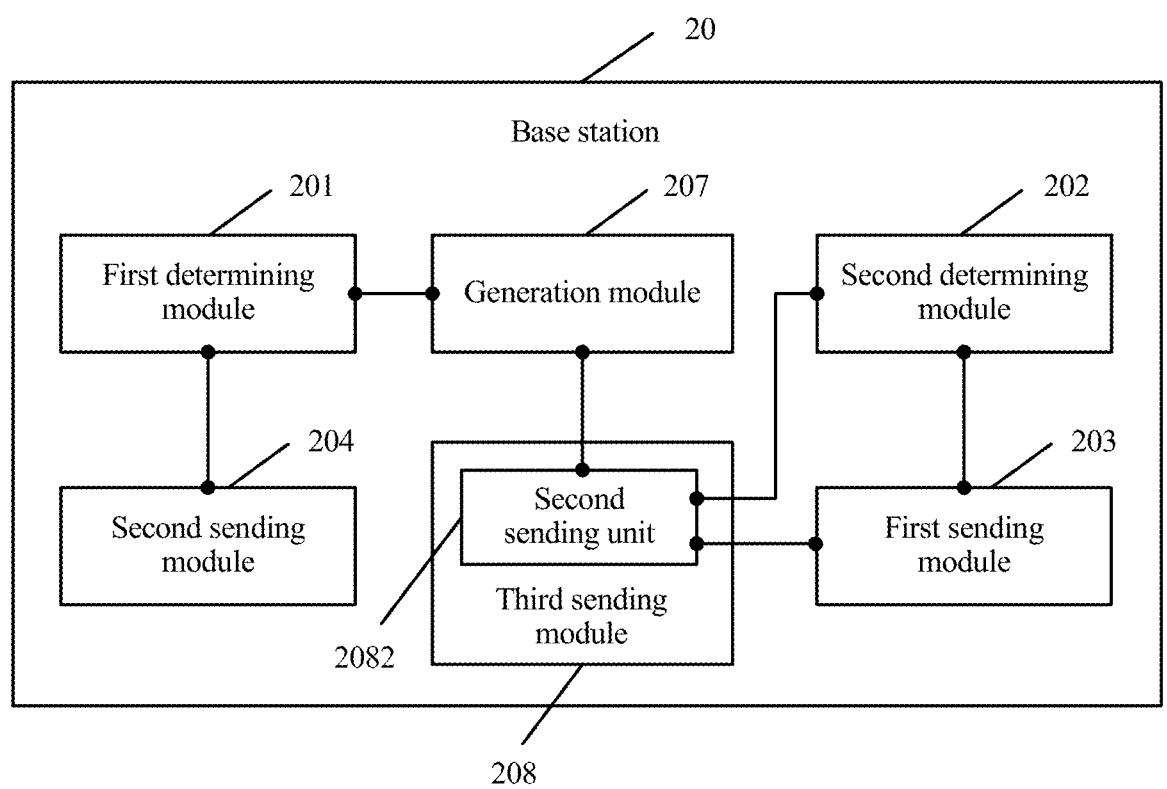
FIG. 10 is a schematic diagram of another embodiment of a base station according to an embodiment of this application.

Optionally, based on the embodiment corresponding to FIG. 8, referring to FIG. 10, in another embodiment of the base station provided in the embodiments of this application, the port indication information is second indication information; and the third sending module 208 includes:

a second sending unit 2082, configured to send second indication information to the target user equipment, where the second indication information is used to indicate a quantity of PCRS ports in the first PCRS port set and/or a quantity of PCRS ports in the second PCRS port set.

In this embodiment of this application, the UE determines, through a quantity of PCRS ports, to receive the PCRS through the first PCRS port set and receive the data through the second PCRS port set. In the foregoing manner, the eNB may notify the target UE of a specific PCRS port that is corresponding to the quantity of PCRS ports and that is used to receive data and a specific PCRS port that is corresponding to the quantity of PCRS ports and that is used to receive a PCRS, and therefore a feasible manner of determining data and PCRS receiving and sending between the eNB and the UE is provided, to improve feasibility and reliability of this solution.

Figure 11:
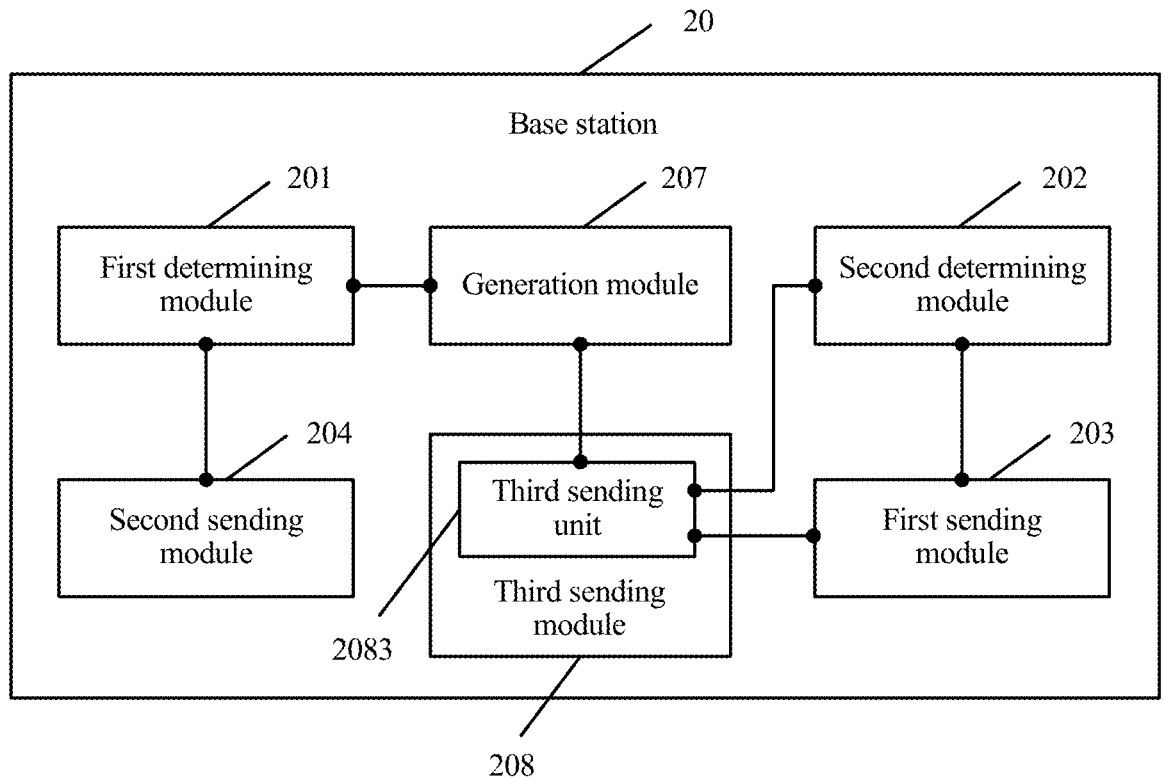
FIG. 11 is a schematic diagram of another embodiment of a base station according to an embodiment of this application.

Optionally, based on the embodiment corresponding to FIG. 8, referring to FIG. 11, in another embodiment of the base station provided in the embodiments of this application, the port indication information is third indication information; and the third sending module 208 includes:

a third sending unit 2083, configured to send third indication information to the target user equipment, where the third indication information is used to indicate the first time-frequency resource element allocated to the target user equipment in the first PCRS port set.

In this embodiment of this application, the UE directly determines, by using PCRS allocation information, the first time-frequency resource element used to transmit a PCRS, and the UE receives, by using the first time-frequency resource element, the PCRS sent by the eNB. In the foregoing manner, the UE can more quickly and accurately learn of a specific time-frequency resource element for receiving a PCRS, without a need to determine a mapping relationship, to save computing resources of the UE and further improve data transmission reliability.

Figure 12:
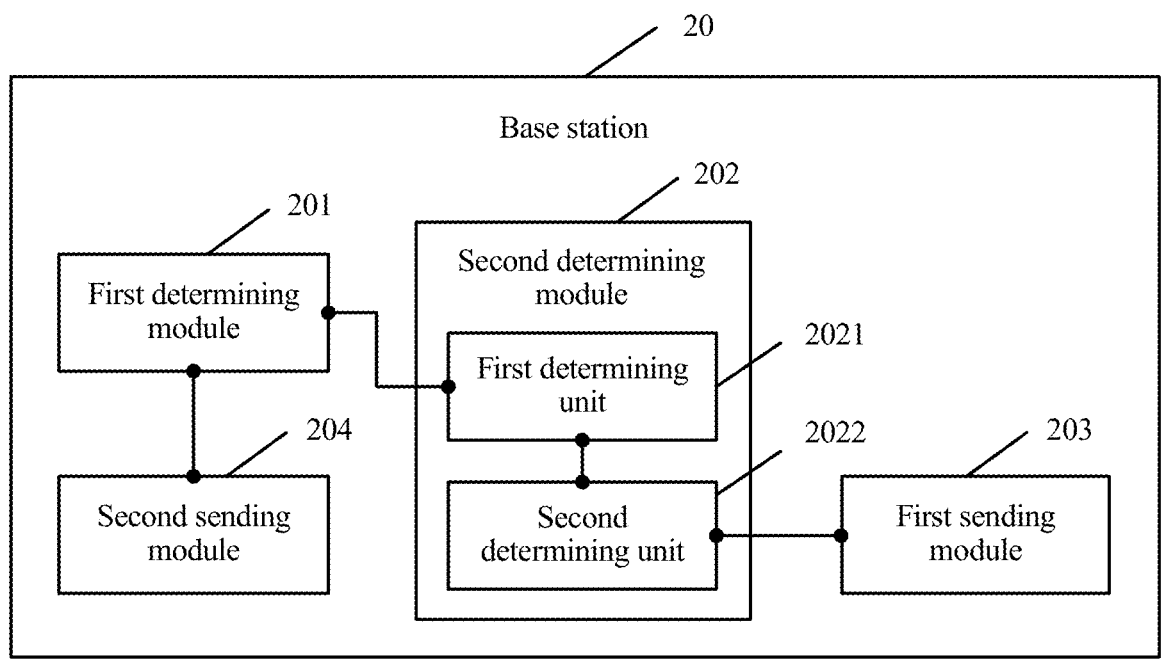
FIG. 12 is a schematic diagram of another embodiment of a base station according to an embodiment of this application.

Optionally, based on the embodiment corresponding to FIG. 6, referring to FIG. 12, in another embodiment of the base station provided in the embodiments of this application, the second determining module 202 includes:

a first determining unit 2021, configured to determine a target modulation and coding scheme MCS, where the target MCS is used to indicate an MCS that is used by the base station to send the data to the target user equipment; and a second determining unit 2022, configured to determine, based on the target MCS determined by the first determining unit 2021, the first time-frequency resource element corresponding to the at least one port used to transmit a PCRS in the first PCRS port set.

In this embodiment of this application, the eNB determines the corresponding first time-frequency resource element in the first PCRS port set. Specifically, the eNB may first determine the MCS, and the target MCS is used to indicate an MCS that is used by the eNB to send the data to the target UE. Then the eNB determines, based on the target MCS, the first time-frequency resource element corresponding to the at least one port used to transmit a PCRS in the first PCRS port set. In addition, the target UE may also receive, in the first scheduling period by using the first time-frequency resource element based on the target MCS determined by the eNB, the PCRS sent by the eNB. In the foregoing manner, the eNB notifies, in an implicit manner without a need to occupy additional bits in control signaling, the UE of the corresponding first time-frequency resource element used to transmit a PCRS. Based on the MCS scheduled by the eNB, the UE can learn of the first time-frequency resource element used to transmit a PCRS, to reduce overheads of the control signaling and improve efficiency of a communications system.

Figure 13:
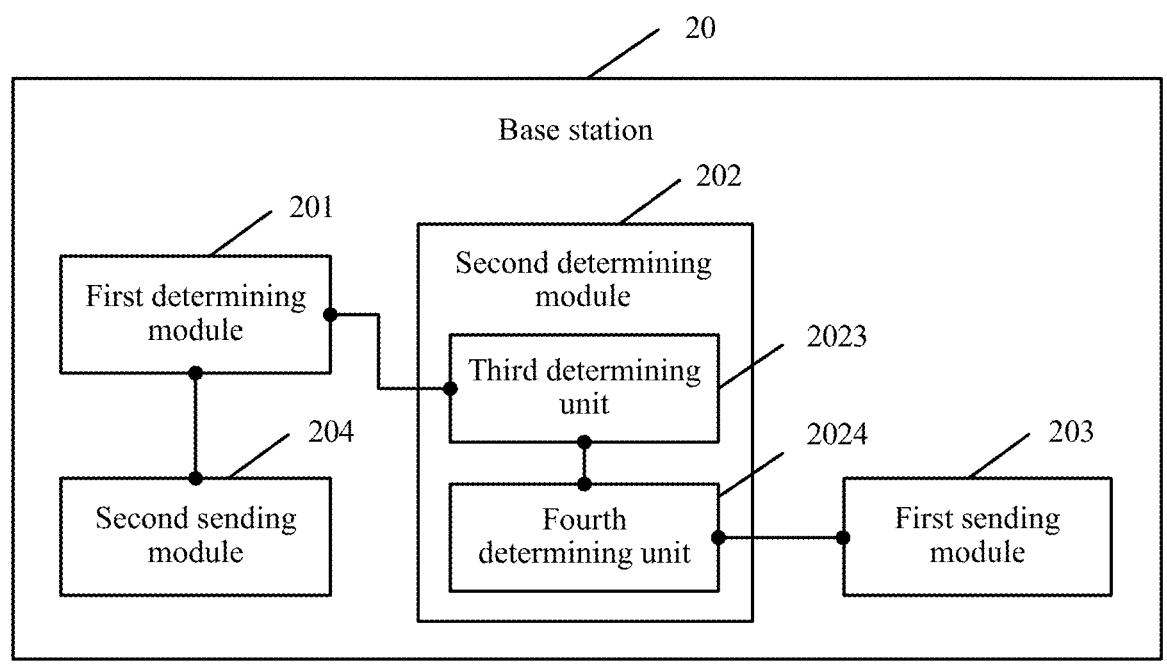
FIG. 13 is a schematic diagram of another embodiment of a base station according to an embodiment of this application.

Optionally, based on the embodiment corresponding to FIG. 6, referring to FIG. 13, in another embodiment of the base station provided in the embodiments of this application, the second determining module 202 includes:

a third determining unit 2023, configured to determine scheduling bandwidth for sending the data to the target user equipment in the first scheduling period; and a fourth determining unit 2024, configured to determine, based on the scheduling bandwidth determined by the third determining unit 2023, the first time-frequency resource element corresponding to the at least one port used to transmit a PCRS in the first PCRS port set.

In this embodiment of this application, the eNB determines the corresponding first time-frequency resource element in the first PCRS port set. Specifically, the eNB may first determine the scheduling bandwidth for sending the data to the target UE in the first scheduling period, and then the eNB determines, based on the scheduling bandwidth, the first time-frequency resource element corresponding to the at least one port used to transmit a PCRS in the first PCRS port set. In the foregoing manner, the eNB may determine the first time-frequency resource element based on the scheduling bandwidth, to improve practicability and operability of this solution.

Figure 14:
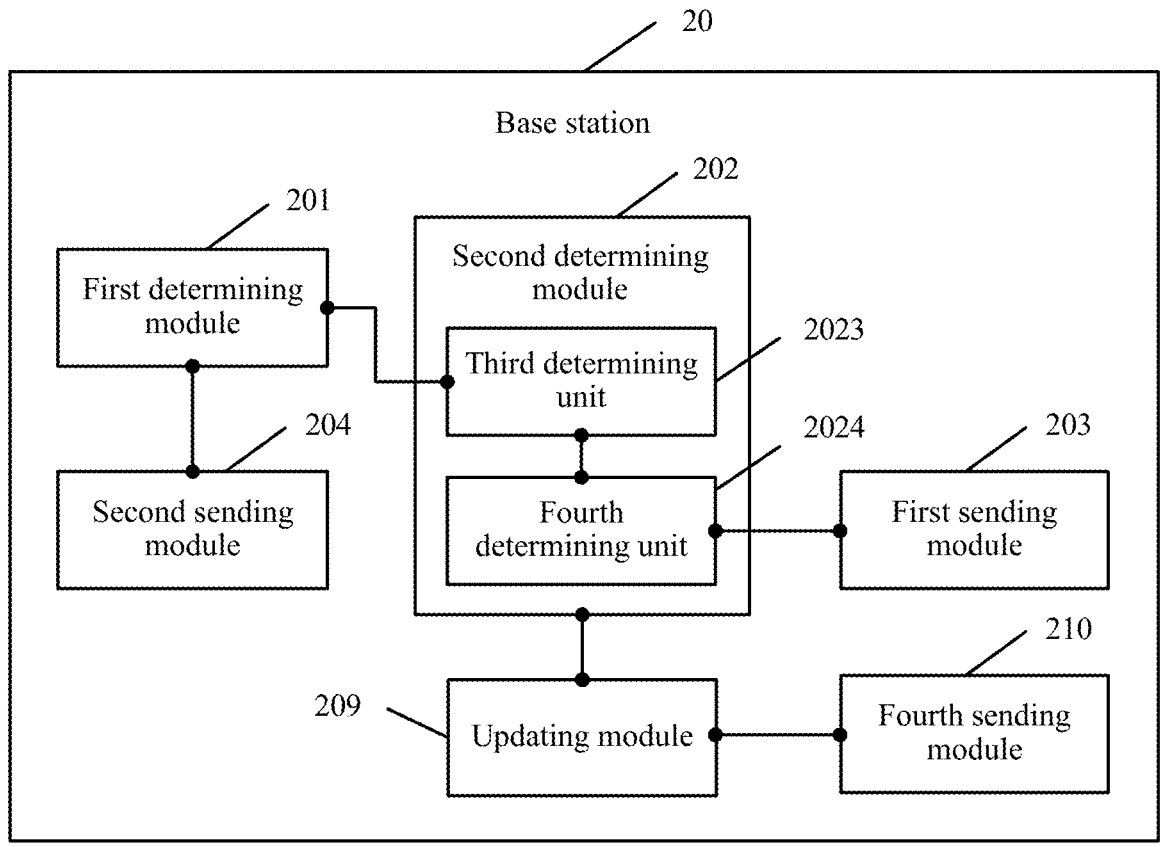
FIG. 14 is a schematic diagram of another embodiment of a base station according to an embodiment of this application.

Optionally, based on the embodiment corresponding to FIG. 12 or FIG. 13, referring to FIG. 14, in another embodiment of the base station provided in the embodiments of this application, the base station 20 further includes:

an updating module 209, configured to: after the second determining module 202 determines the first time-frequency resource element corresponding to the at least one port used to transmit a PCRS in the first PCRS port set, update the first time-frequency resource element in a second scheduling period to obtain an updated third time-frequency resource element; and a fourth sending module 210, configured to send the PCRS on the third time-frequency resource element updated by the updating module 209.

Further, in this embodiment of this application, after the eNB determines the first time-frequency resource element corresponding to the at least one port used to transmit a PCRS in the first PCRS port set, the eNB may further update the first time-frequency resource element in the second scheduling period to obtain the updated third time-frequency resource element, and the eNB sends the PCRS on the third time-frequency resource element. In the foregoing manner, the eNB may dynamically configure a PCRS in each scheduling period, and determine a time-frequency resource element used to transmit a PCRS, to improve practicability and flexibility of this solution.

Figure 15:
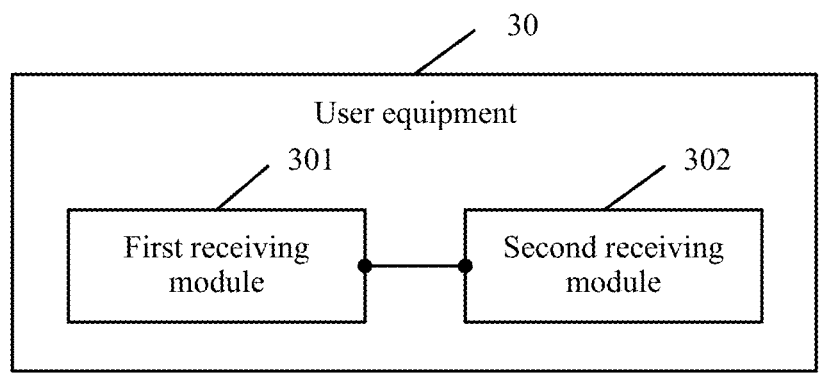
FIG. 15 is a schematic diagram of an embodiment of user equipment according to an embodiment of this application.

The foregoing describes in detail the base station in this application, and the following describes in detail the embodiments of this application from a perspective of user equipment. Referring to FIG. 15, user equipment 30 in an embodiment of this application includes:

a first receiving module 301, configured to: if a quantity of first time-frequency resource elements is greater than or equal to 1, receive, in a first scheduling period by using a first time-frequency resource element, a phase noise compensation pilot signal (PCRS) sent by a base station, where the first time-frequency resource element is determined by the base station from at least one port used to transmit a PCRS in a first PCRS port set; and a second receiving module 302, configured to receive, in the first scheduling period by using a second time-frequency resource element, data sent by the base station, where the second time-frequency resource element is a time-frequency resource element that is not used to transmit a PCRS in a second PCRS port set, and the second PCRS port set does not include a port used to transmit a PCRS in the first scheduling period.

In this embodiment, if the quantity of first time-frequency resource elements is greater than or equal to 1, the first receiving module 301 receives, in the first scheduling period by using the first time-frequency resource element, the phase noise compensation pilot signal (PCRS) sent by the base station, where the first time-frequency resource element is determined by the base station from the at least one port used to transmit a PCRS in the first PCRS port set; and the second receiving module 302 receives, in the first scheduling period by using the second time-frequency resource element, the data sent by the base station, where the second time-frequency resource element is a time-frequency resource element that is not used to transmit a PCRS in the second PCRS port set, and the second PCRS port set does not include a port used to transmit a PCRS in the first scheduling period.

This embodiment of this application provides UE. An eNB first determines a first PCRS port set and a second PCRS port set in a first scheduling period, where the first PCRS port set includes at least one port used to transmit a PCRS, but the second PCRS port set does not include a port used to transmit a PCRS in the first scheduling period; then the eNB determines a first time-frequency resource element corresponding to the at least one port used to transmit a PCRS in the first PCRS port set; and the eNB sends a PCRS to target UE on the first time-frequency resource element, and sends data to the target UE on a second time-frequency resource element corresponding to the second PCRS port set. In the foregoing manner, in a scheduling period, the eNB determines the first time-frequency resource element used to transmit a PCRS, and valid data may be transmitted on all remaining time-frequency resource elements that are not used to transmit a PCRS, to improve PCRS port data transmission efficiency and effectively save PCRS port resources.

Figure 16:
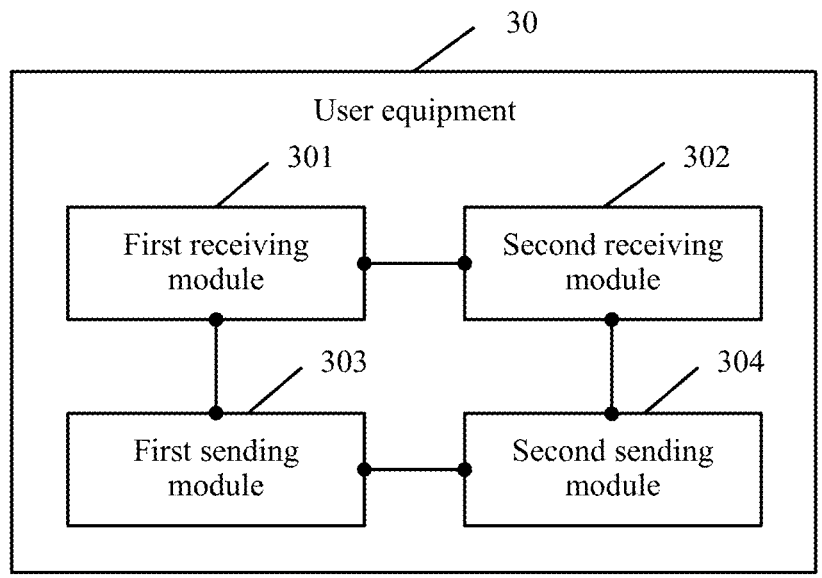
FIG. 16 is a schematic diagram of another embodiment of user equipment according to an embodiment of this application.

Optionally, based on the embodiment corresponding to FIG. 15, referring to FIG. 16, in another embodiment of the user equipment provided in the embodiments of this application, the user equipment 30 further includes:

a first sending module 303, configured to send a PCRS to the base station by using the first time-frequency resource element; and a second sending module 304, configured to send data to the base station by using the second time-frequency resource element.

In this embodiment of this application, the eNB may receive, by using the first time-frequency resource element, the PCRS sent by the target UE, and may further send the PCRS to the target UE by using the first time-frequency resource element. Similarly, the eNB receives, by using the second time-frequency resource element, the data sent by the target UE, and may further send the data to the target UE by using the second time-frequency resource element. In the foregoing manner, integrity of uplink data transmission and downlink data transmission is ensured, thereby improving practicability of this solution.

Figure 17:
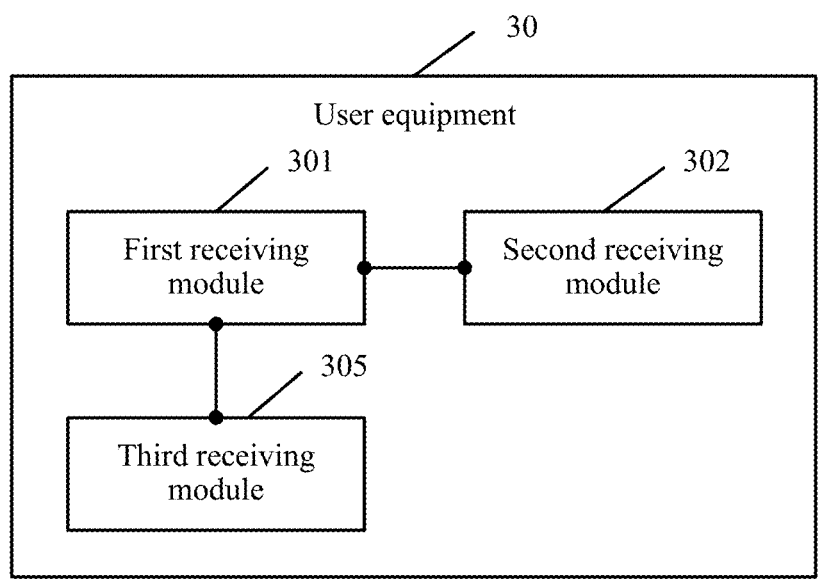
FIG. 17 is a schematic diagram of another embodiment of user equipment according to an embodiment of this application.

Optionally, based on the embodiment corresponding to FIG. 15, referring to FIG. 17, in another embodiment of the user equipment provided in the embodiments of this application, the user equipment 30 further includes:

a third receiving module 305, configured to: before the first receiving module 301 receives, in the first scheduling period by using the first time-frequency resource element, the PCRS sent by the base station, receive port indication information sent by the base station, where the port indication information is used by the target user equipment to receive the PCRS through the first PCRS port set and receive the data through the second PCRS port set.

In this embodiment of this application, after the eNB determines the first PCRS port set and the second PCRS port set in the first scheduling period, the eNB generates the port indication information corresponding to the first scheduling period, and then sends the port indication information to the target UE, so that the target UE determines, according to the port indication information, to receive the PCRS through the first PCRS port set and receive the data through the second PCRS port set. In the foregoing manner, the eNB may use the port indication information to notify the UE of a specific PCRS port for receiving data, to ensure feasibility of this solution. In addition, statuses of data and PCRS receiving and sending between the eNB and the UE may be determined by using the port indication information, to improve accuracy and reliability of this solution.

Figure 18:
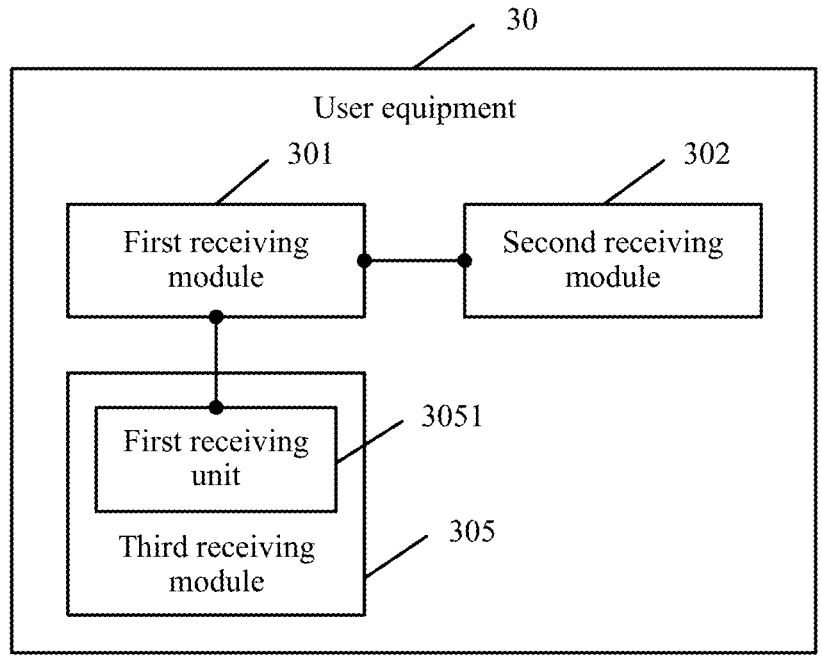
FIG. 18 is a schematic diagram of another embodiment of user equipment according to an embodiment of this application.

Optionally, based on the embodiment corresponding to FIG. 17, referring to FIG. 18, in another embodiment of the user equipment provided in the embodiments of this application, the port indication information is first indication information; and the third receiving module 305 includes:

a first receiving unit 3051, configured to receive the first indication information sent by the base station, where the first indication information is used to indicate a port number of at least one PCRS port in the second PCRS port set.

In this embodiment of this application, the UE determines, by using a port number, to receive the PCRS through the first PCRS port set and receive the data through the second PCRS port set. In the foregoing manner, the eNB may notify the target UE of a specific PCRS port that is corresponding to the port number and that is used to receive data, and therefore a feasible manner of determining data and PCRS receiving and sending between the eNB and the UE is provided, to improve feasibility and reliability of this solution.

Figure 19:
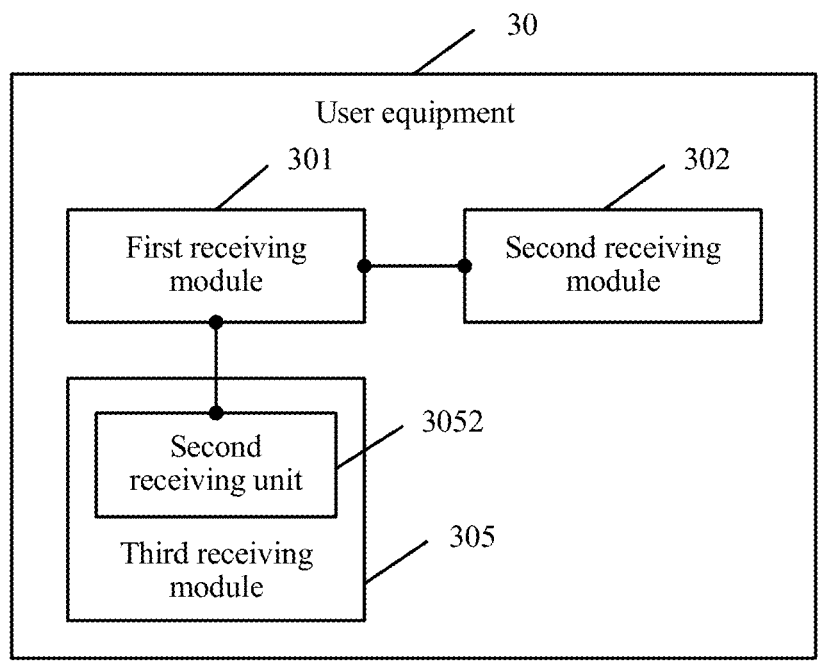
FIG. 19 is a schematic diagram of another embodiment of user equipment according to an embodiment of this application.

Optionally, based on the embodiment corresponding to FIG. 17, referring to FIG. 19, in another embodiment of the user equipment provided in the embodiments of this application, the port indication information is second indication information; and the third receiving module 305 includes:

a second receiving unit 3052, configured to receive the second indication information sent by the base station, where the second indication information is used to indicate a quantity of PCRS ports in the first PCRS port set and/or a quantity of PCRS ports in the second PCRS port set.

In this embodiment of this application, the UE determines, through a quantity of PCRS ports, to receive the PCRS through the first PCRS port set and receive the data through the second PCRS port set. In the foregoing manner, the eNB may notify the target UE of a specific PCRS port that is corresponding to the quantity of PCRS ports and that is used to receive data and a specific PCRS port that is corresponding to the quantity of PCRS ports and that is used to receive a PCRS, and therefore a feasible manner of determining data and PCRS receiving and sending between the eNB and the UE is provided, to improve feasibility and reliability of this solution.

Figure 20:
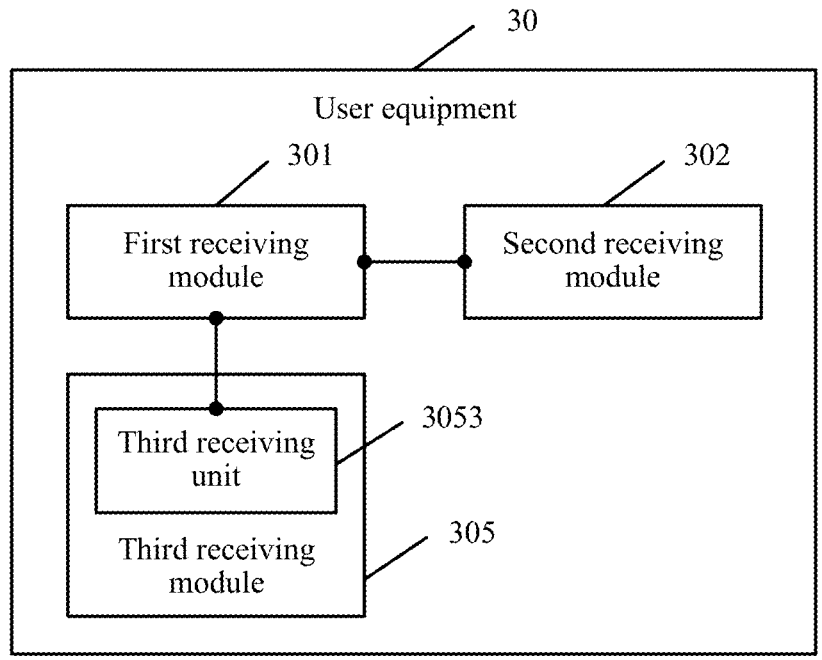
FIG. 20 is a schematic diagram of another embodiment of user equipment according to an embodiment of this application.

Optionally, based on the embodiment corresponding to FIG. 17, referring to FIG. 20, in another embodiment of the user equipment provided in the embodiments of this application, the port indication information is third indication information; and the third receiving module 305 includes:

a third receiving unit 3053, configured to receive the third indication information sent by the base station, where the third indication information is used to indicate the first time-frequency resource element allocated by the base station to the target user equipment in the first PCRS port set.

In this embodiment of this application, the UE directly determines, by using PCRS allocation information, the first time-frequency resource element used to transmit a PCRS, and the UE receives, by using the first time-frequency resource element, the PCRS sent by the eNB. In the foregoing manner, the UE can more quickly and accurately learn of a specific time-frequency resource element for receiving a PCRS, without a need to determine a mapping relationship, to save computing resources of the UE and further improve data transmission reliability.

Figure 21:
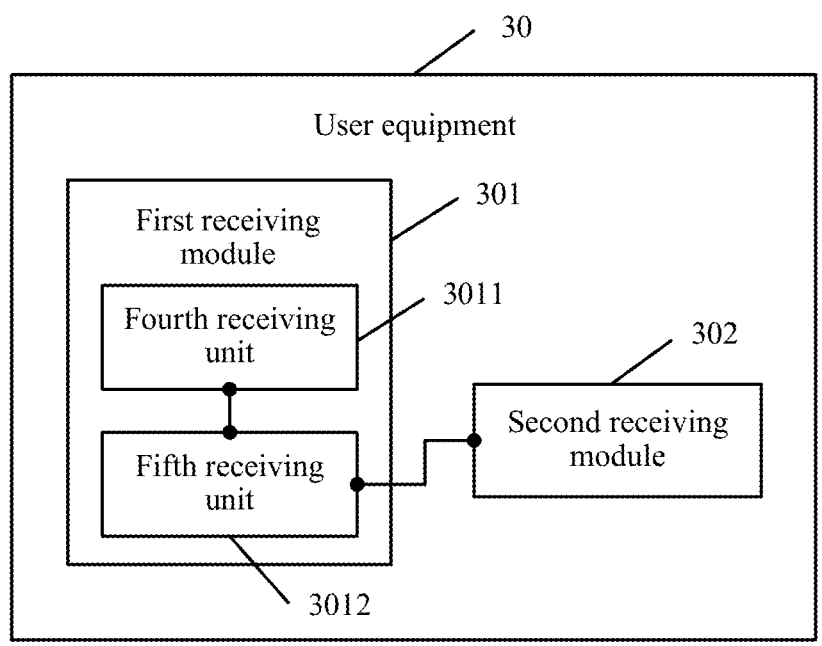
FIG. 21 is a schematic diagram of another embodiment of user equipment according to an embodiment of this application.

Optionally, based on the embodiment corresponding to FIG. 15, referring to FIG. 21, in another embodiment of the user equipment provided in the embodiments of this application, the first receiving module 301 includes:

a fourth receiving unit 3011, configured to receive a target modulation and coding scheme MCS determined by the base station, where the target MCS is used to indicate an MCS that is used by the base station to send the data to the target user equipment; and a fifth receiving unit 3012, configured to receive, in the first scheduling period by using the first time-frequency resource element based on the target MCS received by the fourth receiving unit 3011, the PCRS sent by the base station.

In this embodiment of this application, the eNB determines the corresponding first time-frequency resource element in the first PCRS port set. Specifically, the eNB may first determine the MCS, and the target MCS is used to indicate an MCS that is used by the eNB to send the data to the target UE. Then the eNB determines, based on the target MCS, the first time-frequency resource element corresponding to the at least one port used to transmit a PCRS in the first PCRS port set. In addition, the target UE may also receive, in the first scheduling period by using the first time-frequency resource element based on the target MCS determined by the eNB, the PCRS sent by the eNB. In the foregoing manner, the eNB notifies, in an implicit manner without a need to occupy additional bits in control signaling, the UE of the corresponding first time-frequency resource element used to transmit a PCRS. Based on the MCS scheduled by the eNB, the UE can learn of the first time-frequency resource element used to transmit a PCRS, to reduce overheads of the control signaling and improve efficiency of a communications system.

Figure 22:
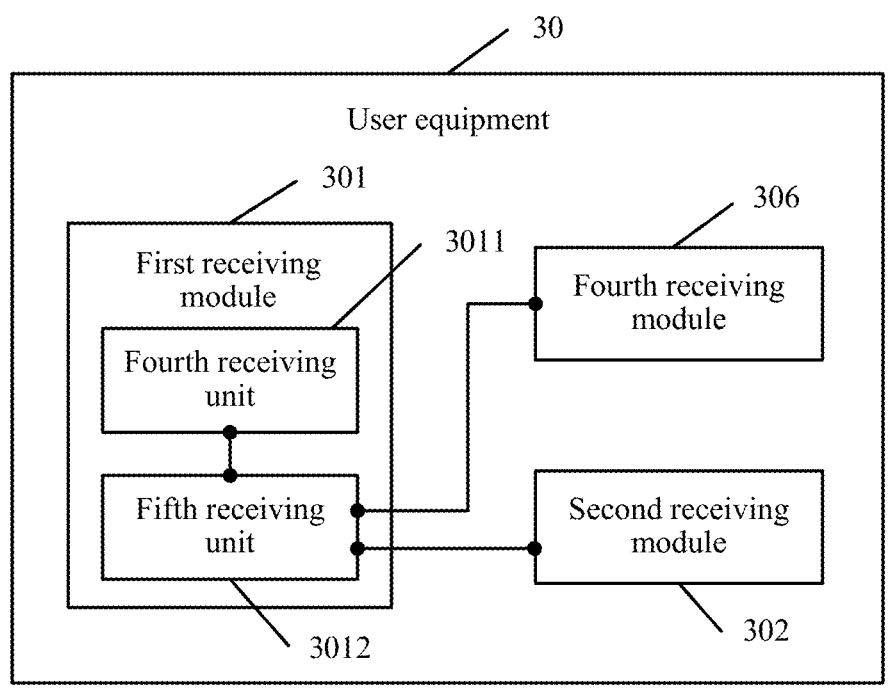
FIG. 22 is a schematic diagram of another embodiment of user equipment according to an embodiment of this application.

Optionally, based on the embodiment corresponding to FIG. 21, referring to FIG. 22, in another embodiment of the user equipment provided in the embodiments of this application, the user equipment 30 further includes:

a fourth receiving module 306, configured to receive the PCRS on a third time-frequency resource element after the first receiving module 301 receives, in the first scheduling period by using the first time-frequency resource element, the phase noise compensation pilot signal (PCRS) sent by the base station, where the third time-frequency resource element is obtained after the base station updates the first time-frequency resource element in a second scheduling period.

Further, in this embodiment of this application, after the eNB determines the first time-frequency resource element corresponding to the at least one port used to transmit a PCRS in the first PCRS port set, the eNB may further update the first time-frequency resource element in the second scheduling period to obtain the updated third time-frequency resource element, and the eNB sends the PCRS to the target UE on the third time-frequency resource element. In the foregoing manner, the eNB may dynamically configure a PCRS in each scheduling period, and determine a time-frequency resource element used to transmit a PCRS, to improve practicability and flexibility of this solution.

Figure 23:
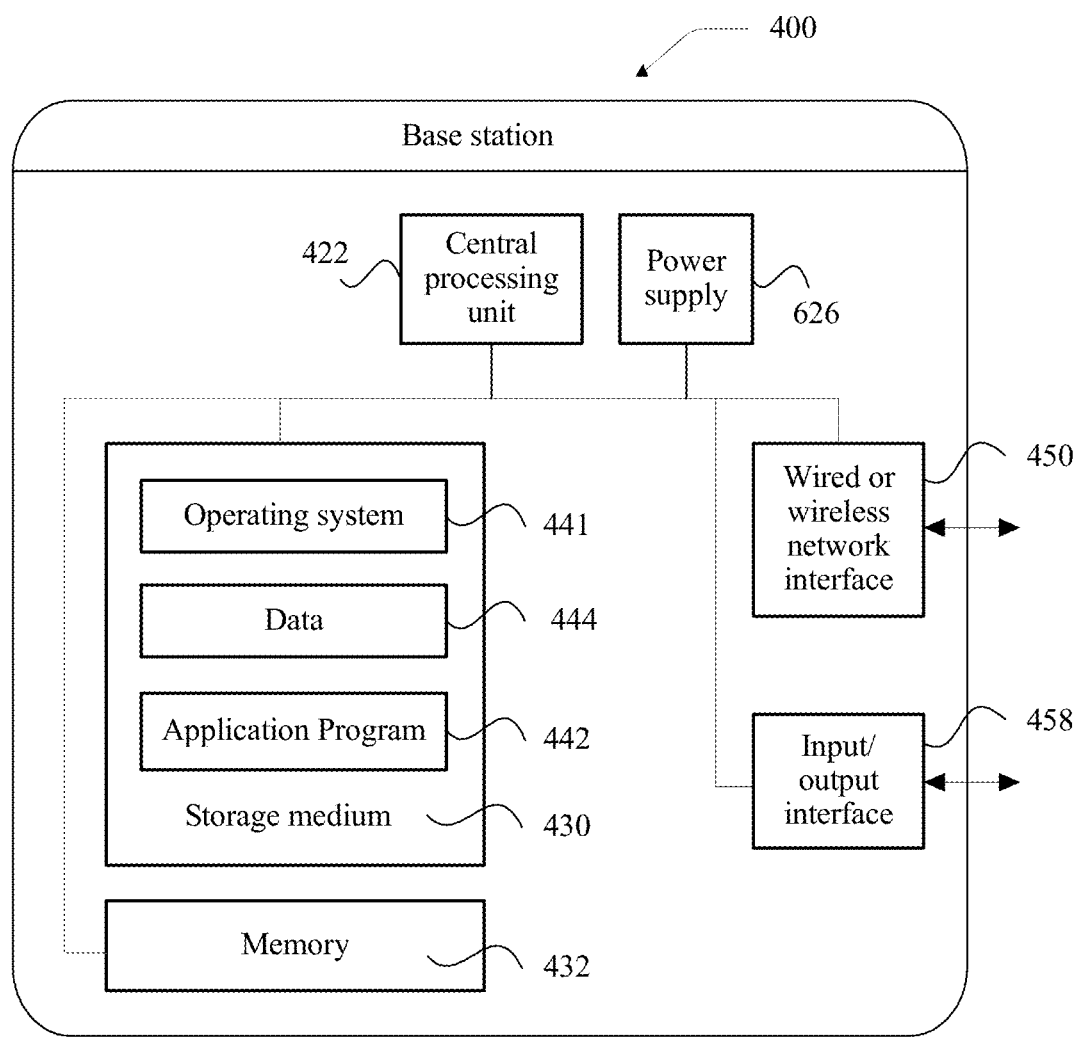
FIG. 23 is a schematic structural diagram of a base station according to an embodiment of this application.

FIG. 23 is a schematic structural diagram of a server according to an embodiment of this application. The server 400 may differ greatly because of different configurations or performance, and may include one or more central processing units (CPU) 422 (for example, one or more processors), a memory 432, and one or more storage media 430 (for example, one or more mass storage devices) that store an application program 442 or data 444. The memory 432 and the storage medium 430 may be used for temporary storage or permanent storage. The program stored in the storage medium 430 may include one or more modules (not shown in the figure), and each module may include a series of instruction operations for the server. Further, the central processing unit 422 may be configured to communicate with the storage medium 430 to perform, on the server 400, a series of instruction operations in the storage medium 430.

The server 400 may further include one or more power supplies 426, one or more wired or wireless network interfaces 450, one or more input/output interfaces 458, and/or one or more operating systems 441 such as Windows Server™, Mac OS X™, Unix™, Linux™, and FreeBSD™.

Steps performed by the server in the foregoing embodiment may be based on the server structure shown in FIG. 23.

In this embodiment of this application, the central processing unit 422 included in the server further has the following functions:

determining a first phase noise compensation pilot signal (PCRS) port set and a second PCRS port set in a first scheduling period, where the first PCRS port set includes at least one port used to transmit a PCRS, but the second PCRS port set does not include a port used to transmit a PCRS in the first scheduling period;

determining a first time-frequency resource element corresponding to the at least one port used to transmit a PCRS in the first PCRS port set;

if a quantity of first time-frequency resource elements is greater than or equal to 1, sending a PCRS to target user equipment on the first time-frequency resource element; and sending data to the target user equipment on a second time-frequency resource element corresponding to the second PCRS port set.

Optionally, the central processing unit 422 is further configured to:

receive, on the first time-frequency resource element, a PCRS sent by the target user equipment; and receive, on the second time-frequency resource element corresponding to the second PCRS port set, data sent by the target user equipment.

Optionally, the central processing unit 422 is further configured to:

generate port indication information corresponding to the first scheduling period; and send the port indication information to the target user equipment, where the port indication information is used by the target user equipment to receive the PCRS through the first PCRS port set and receive the data through the second PCRS port set.

Optionally, the central processing unit 422 is further configured to:

send first indication information to the target user equipment, where the first indication information is used to indicate a port number of at least one PCRS port in the second PCRS port set.

Optionally, the central processing unit 422 is further configured to:

send the second indication information to the target user equipment, where the second indication information is used to indicate a quantity of PCRS ports in the first PCRS port set and/or a quantity of PCRS ports in the second PCRS port set.

Optionally, the central processing unit 422 is further configured to:

send the third indication information to the target user equipment, where the third indication information is used to indicate the first time-frequency resource element allocated to the target user equipment in the first PCRS port set.

Optionally, the central processing unit 422 is further configured to:

determine a target modulation and coding scheme MCS, where the target MCS is used to indicate an MCS that is used by the base station to send the data to the target user equipment; and determine, based on the target MCS, the first time-frequency resource element corresponding to the at least one port used to transmit a PCRS in the first PCRS port set.

Optionally, the central processing unit 422 is further configured to:

determine scheduling bandwidth for sending the data to the target user equipment in the first scheduling period; and determine, based on the scheduling bandwidth, the first time-frequency resource element corresponding to the at least one port used to transmit a PCRS in the first PCRS port set.

Optionally, the central processing unit 422 is further configured to:

update the first time-frequency resource element in a second scheduling period to obtain an updated third time-frequency resource element; and send the PCRS on the third time-frequency resource element.

Figure 24:
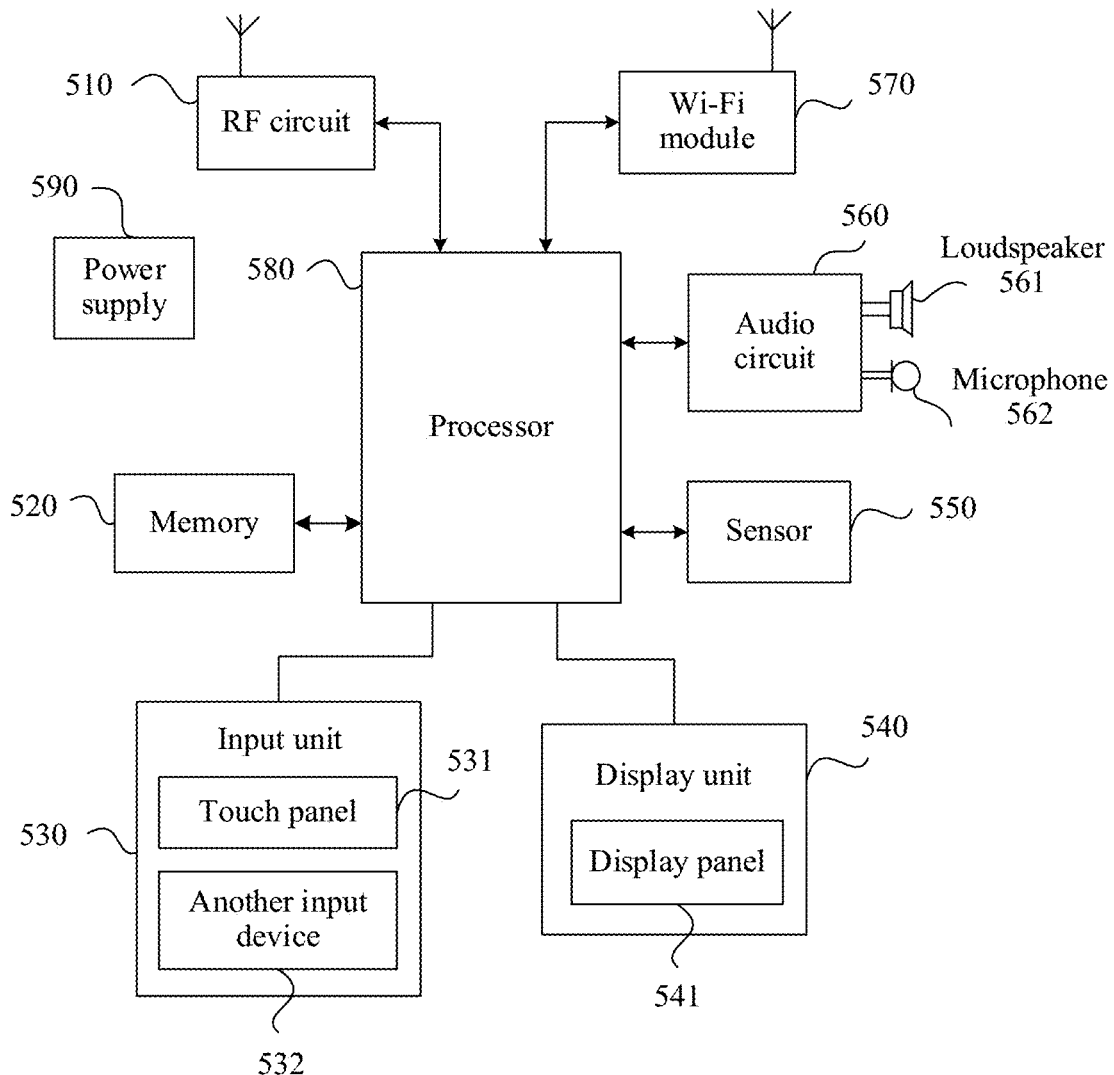
FIG. 24 is a schematic structural diagram of user equipment according to an embodiment of this application.

As shown in FIG. 24, an embodiment of this application further provides another UE. For ease of description, only a part related to this embodiment of this application is illustrated. For specific technical details that are not disclosed, refer to the method part in the embodiments of this application. The UE may be any UE device such as a mobile phone, a tablet computer, a personal digital assistant (PDA), a point of sale (POS), or an in-vehicle computer. For example, the UE is a mobile phone.

FIG. 24 is a block diagram of a partial structure of a mobile phone related to the UE provided in this embodiment of this application. Referring to FIG. 24, the mobile phone includes components such as a radio frequency (RF) circuit 510, a memory 520, an input unit 530, a display unit 540, a sensor 550, an audio circuit 560, a Wireless Fidelity (Wi-Fi) module 570, a processor 580, and a power supply 590. Persons skilled in the art may understand that the structure of the mobile phone shown in FIG. 24 does not constitute a limitation on the mobile phone, and the mobile phone may include more or fewer components than those shown in the figure, or combine some components, or have different component arrangements.

The following describes each component of the mobile phone in detail with reference to FIG. 24.

The RF circuit 510 may be configured to receive and send information, or receive and send a signal in a call process;

particularly, after receiving downlink information of a base station, send the downlink information to the processor 580 for processing; and in addition, send related uplink data to the base station. Generally, the RF circuit 510 includes but is not limited to an antenna, at least one amplifier, a transceiver, a coupler, a low noise amplifier (LNA), a duplexer, and the like. In addition, the RF circuit 510 may further communicate with a network and another device through wireless communication. Any communications standard or protocol may be used for the wireless communication, including but not limited to a Global System for Mobile Communications (GSM), a general packet radio service (GPRS), Code Division Multiple Access (CDMA), Wideband Code Division Multiple Access (WCDMA), Long Term Evolution (LTE), an email, a short message service (SMS), and the like.

The memory 520 may be configured to store a software program and a module. The processor 580 executes various functional applications of the mobile phone and data processing by running the software program and the module stored in the memory 520. The memory 520 may mainly include a program storage area and a data storage area. The program storage area may store an operating system, an application program required by at least one function (such as a sound play function or an image play function), and the like. The data storage area may store data (such as audio data or an address book) created based on use of the mobile phone, and the like. In addition, the memory 520 may include a high-speed random access memory, and may further include a nonvolatile memory, for example, at least one magnetic disk storage device, a flash storage device, or another volatile solid-state storage device.

The input unit 530 may be configured to: receive entered digit or character information, and generate key signal input related to user setting and function control of the mobile phone. Specifically, the input unit 530 may include a touch panel 531 and another input device 532. The touch panel 531, also referred to as a touchscreen, may collect a touch operation (for example, an operation performed by a user on the touch panel 531 or near the touch panel 531 by using any proper object or accessory such as a finger or a stylus) of the user on or near the touch panel 531, and drive a corresponding connection apparatus based on a preset program. Optionally, the touch panel 531 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into touch point coordinates, and sends the touch point coordinates to the processor 580, and can receive and execute a command sent by the processor 580. In addition, the touch panel 531 may be implemented by using a plurality of types such as a resistive type, a capacitive type, an infrared ray, and a surface acoustic wave. In addition to the touch panel 531, the input unit 530 may include the another input device 532. Specifically, the another input device 532 may include but is not limited to one or more of a physical keyboard, a function key (such as a volume control key or an on/off key), a trackball, a mouse, a joystick, and the like.

The display unit 540 may be configured to display information entered by the user or information provided for the user, and various menus of the mobile phone. The display unit 540 may include a display panel 541. Optionally, the display panel 541 may be configured in a form of a liquid crystal display (LCD), an organic light-emitting diode (OLED), or the like. Further, the touch panel 531 may cover the display panel 541. When detecting the touch operation on or near the touch panel 531, the touch panel 131 transfers the touch operation to the processor 580 to determine a type of a touch event, and then the processor 580 provides corresponding visual output on the display panel 541 based on the type of the touch event. In FIG. 24, the touch panel 531 and the display panel 541 are used as two independent components to implement input and output functions of the mobile phone. However, in some embodiments, the touch panel 531 and the display panel 541 may be integrated to implement the input and output functions of the mobile phone.

The mobile phone may further include at least one type of sensor 550, such as a light sensor, a motion sensor, or another sensor. Specifically, the light sensor may include an ambient light sensor and a proximity sensor. The ambient light sensor may adjust luminance of the display panel 541 based on brightness of ambient light. The proximity sensor may turn off the display panel 541 and/or backlight when the mobile phone moves to an ear of the user. As one type of the motion sensor, an acceleration sensor may detect acceleration magnitudes in all directions (generally, three axes), may detect a magnitude and a direction of gravity in a static state, and may be used in an application for identifying a mobile phone posture (such as screen switching between landscape and portrait modes, a related game, or magnetometer posture calibration), a function related to vibration identification (such as a pedometer or a knock), and the like. For the another sensor such as a gyroscope, a barometer, a hygrometer, a thermometer, or an infrared sensor that may be further disposed on the mobile phone, details are not described herein.

The audio circuit 560, a loudspeaker 561, and a microphone 562 may provide an audio interface between the user and the mobile phone. The audio circuit 560 may receive audio data, convert the audio data into an electrical signal, and transmit the electrical signal to the loudspeaker 561, and the loudspeaker 561 converts the electrical signal into a sound signal for output. In addition, the microphone 562 converts a collected sound signal into an electrical signal. The audio circuit 560 receives the electrical signal, converts the electrical signal into audio data, and then outputs the audio data to the processor 580 for processing. The processor 580 sends the audio data to, for example, another mobile phone by using the RF circuit 510, or outputs the audio data to the memory 520 for further processing.

Wi-Fi belongs to a short-distance wireless transmission technology. The mobile phone may help, by using the Wi-Fi module 570, the user receive and send an email, browse a web page, access streaming media, and the like. The Wi-Fi module 370 provides wireless broadband Internet access for the user. Although the Wi-Fi module 570 is shown in FIG. 24, it may be understood that the Wi-Fi module 1170 is not a mandatory component of the mobile phone, and may be omitted as required without changing the essence of this application.

The processor 580 is a control center of the mobile phone, connects various parts of the entire mobile phone by using various interfaces and lines, and performs various functions of the mobile phone and data processing by running or executing the software program and/or the module stored in the memory 520 and by invoking data stored in the memory 520, to perform overall monitoring on the mobile phone. Optionally, the processor 580 may include one or more processing units. Preferably, an application processor and a modem processor may be integrated into the processor 580.

The application processor mainly processes an operating system, a user interface, an application program, and the like. The modem processor mainly processes wireless communication. It may be understood that the modem processor may alternatively be not integrated into the processor 580.

The mobile phone further includes the power supply 590 (such as a battery) that supplies power to each part. Preferably, the power supply may be logically connected to the processor 580 by using a power management system, so that functions such as charging management, discharging management, and power consumption management are implemented by using the power supply management system.

Although not illustrated, the mobile phone may further include a camera, a Bluetooth module, and the like. Details are not described herein.

In this embodiment of this application, the processor 580 included in the UE further has the following functions:

if a quantity of first time-frequency resource elements is greater than or equal to 1, receiving, in a first scheduling period by using the first time-frequency resource element, a phase noise compensation pilot signal (PCRS) sent by a base station, where the first time-frequency resource element is determined by the base station from at least one port used to transmit a PCRS in a first PCRS port set; and receiving, in the first scheduling period by using a second time-frequency resource element, data sent by the base station, where the second time-frequency resource element is a time-frequency resource element that is not used to transmit a PCRS in a second PCRS port set, and the second PCRS port set does not include a port used to transmit a PCRS in the first scheduling period.

Optionally, the processor 580 is further configured to:
send a PCRS to the base station by using the first time-frequency resource element; and
send data to the base station by using the second time-frequency resource element.

Optionally, the processor 580 is further configured to:
receive port indication information sent by the base station, where the port indication information is used by the target user equipment to receive the PCRS through the first PCRS port set and receive the data through the second PCRS port set.

Optionally, the processor 580 is further configured to:
receive the first indication information sent by the base station, where the first indication information is used to indicate a port number of at least one PCRS port in the second PCRS port set.

Optionally, the processor 580 is further configured to:
receive the second indication information sent by the base station, where the second indication information is used to indicate a quantity of PCRS ports in the first PCRS port set and/or a quantity of PCRS ports in the second PCRS port set.

Optionally, the processor 580 is further configured to:
receive the third indication information sent by the base station, where the third indication information is used to indicate the first time-frequency resource element allocated by the base station to the target user equipment in the first PCRS port set.

Optionally, the processor 580 is further configured to:
receive a target modulation and coding scheme MCS determined by the base station, where the target MCS is used to indicate an MCS that is used by the base station to send the data to the target user equipment; and
receive, in the first scheduling period by using the first time-frequency resource element based on the target MCS, the PCRS sent by the base station.

Optionally, the processor 580 is further configured to:
receive the PCRS on a third time-frequency resource element, where the third time-frequency resource element is obtained after the base station updates the first time-frequency resource element in a second scheduling period.

Figure 25:
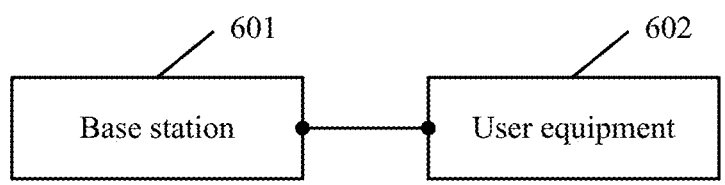
FIG. 25 is a schematic diagram of an embodiment of a data transmission system according to an embodiment of this application.

The following describes a data transmission system in an embodiment of this application. Referring to FIG. 25, the data transmission system in this embodiment of this application includes:

a base station 601 and user equipment 602.

In this embodiment, the base station 601 determines a first phase noise compensation pilot signal (PCRS) port set and a second PCRS port set in a first scheduling period, where the first PCRS port set includes at least one port used to transmit a PCRS, but the second PCRS port set does not include a port used to transmit a PCRS in the first scheduling period; the base station 601 determines a first time-frequency resource element corresponding to the at least one port used to transmit a PCRS in the first PCRS port set; if a quantity of first time-frequency resource elements is greater than or equal to 1, the base station 601 sends a PCRS to the target user equipment 602 on the first time-frequency resource element; and the base station 601 sends data to the target user equipment 602 on a second time-frequency resource element corresponding to the second PCRS port set.

In this embodiment, if a quantity of first time-frequency resource elements is greater than or equal to 1, the user equipment 602 receives, in a first scheduling period by using the first time-frequency resource element, a phase noise compensation pilot signal (PCRS) sent by the base station 601, where the first time-frequency resource element is determined by the base station 601 from at least one port used to transmit a PCRS in a first PCRS port set; and the user equipment 602 receives, in the first scheduling period by using a second time-frequency resource element, data sent by the base station 601, where the second time-frequency resource element is a time-frequency resource element that is not used to transmit a PCRS in a second PCRS port set, and the second PCRS port set does not include a port used to transmit a PCRS in the first scheduling period.

This embodiment of this application provides a data transmission system. An eNB first determines a first PCRS port set and a second PCRS port set in a first scheduling period, where the first PCRS port set includes at least one port used to transmit a PCRS, but the second PCRS port set does not include a port used to transmit a PCRS in the first scheduling period; then the eNB determines a first time-frequency resource element corresponding to the at least one port used to transmit a PCRS in the first PCRS port set; and the eNB sends a PCRS to target UE on the first time-frequency resource element, and sends data to the target UE on a second time-frequency resource element corresponding to the second PCRS port set. In the foregoing manner, in a scheduling period, the eNB determines the first time-frequency resource element used to transmit a PCRS, and valid data may be transmitted on all remaining time-frequency resource elements that are not used to transmit a PCRS, to improve PCRS port data transmission efficiency and effectively save PCRS port resources.

It may be clearly understood by persons skilled in the art that, for the purpose of convenient and brief description, already-described details relating to the foregoing systems, apparatuses, and units are not repeated.

In the several embodiments provided in this application, it should be understood that the disclosed systems, apparatuses, and methods may be implemented in other manners.

For example, the described apparatus embodiments are merely examples. For example, the unit division may be merely a logical function division and there may be other divisions in actual implementation. For example, a plurality of units or components may be combined or integrated into another system, or some features may be omitted. In addition, the illustrated or discussed mutual couplings or direct couplings or communication connections may be implemented by using interfaces. The indirect couplings or communication connections between the apparatuses or units may be implemented in electrical, mechanical, or other forms.

The units described as separate parts may or may not be physically separate, and parts illustrated as units may or may not be physical units, may be located in one position, or may be distributed on a plurality of network units. Some or all of the units may be selected according to actual needs of a corresponding embodiment to achieve the objectives of the corresponding embodiment.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, technical solutions of this application may be implemented in the form of a software product. The software product is stored in a storage medium and includes several instructions for instructing a computer device (which may be a personal computer, a server, or a network device) to perform all or a part of the steps of the methods described in embodiments of this application. The foregoing storage medium includes: any medium that can store program code, such as a Universal Serial Bus (USB) flash drive, a removable hard disk, a read-only memory (ROM), a random access memory (RAM), a magnetic disk, or an optical disc.

The foregoing embodiments are merely intended for describing exemplary technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A data transmission method, comprising:
 determining, by a base station, a target modulation and coding scheme (MCS) to be used by the base station to transmit data to a user equipment, wherein the determined target MCS indicates whether a phase noise compensation reference signal (PCRS) is to be sent to the user equipment;
 determining, by the base station, a first PCRS port set and a second PCRS port set in a first scheduling period, wherein the first PCRS port set comprises at least one port to be used for transmitting the PCRS in the first scheduling period, and the second PCRS port set does not comprise any port to be used for transmitting any PCRS in the first scheduling period;
 based on the determined target MCS, determining, by the base station, a first time-frequency resource element corresponding to the at least one port to be used for transmitting the PCRS in the first PCRS port set;
 in response to a quantity of first time-frequency resource elements being greater than or equal to 1, transmitting, by the base station, the PCRS to the user equipment on the first time-frequency resource element in the first scheduling period; and
 transmitting, by the base station, the data to the user equipment on a second time-frequency resource element corresponding to the second PCRS port set in the first scheduling period.

2. The method according to claim 1, wherein after determining the first PCRS port set and the second PCRS port set in the first scheduling period, the method further comprises:
 generating, by the base station, port indication information corresponding to the first scheduling period; and
 transmitting, by the base station, the port indication information to the user equipment, wherein the port indication information facilitates the user equipment receiving the PCRS through the first PCRS port set and receiving the data through the second PCRS port set.

3. The method according to claim 1, wherein the first time-frequency resource element corresponding to the at least one port to be used for transmitting the PCRS in the first PCRS port set is determined based on the target MCS.

4. The method according to claim 1, wherein the first time-frequency resource element corresponding to the at least one port to be used for transmitting the PCRS in the first PCRS port set is determined based on a scheduling bandwidth.

5. The method according to claim 1, wherein the first time-frequency resource element corresponding to the at least one port to be used for transmitting the PCRS in the first PCRS port set is determined based on: the target MCS, and an association between the target MCS and a PCRS transmission pattern.

6. A base station, comprising:
 a non-transitory storage medium including executable instructions; and
 a processor;
 wherein the executable instructions, when executed by the processor, facilitate:
 determining a target modulation and coding scheme (MCS) to be used by the base station to transmit data to a user equipment, wherein the determined target MCS indicates whether a phase noise compensation reference signal (PCRS) is to be sent to the user equipment;
 determining a first PCRS port set and a second PCRS port set in a first scheduling period, wherein the first PCRS port set comprises at least one port to be used for transmitting the PCRS in the first scheduling period, and the second PCRS port set does not comprise any port to be used for transmitting any PCRS in the first scheduling period;
 based on the determined target MCS, determining a first time-frequency resource element corresponding to the at least one port to be used for transmitting the PCRS in the first PCRS port set;
 in response to a quantity of first time-frequency resource elements being greater than or equal to 1, transmitting the PCRS to the user equipment on the first time-frequency resource element in the first scheduling period; and
 transmitting the data to the user equipment on a second time-frequency resource element corresponding to the second PCRS port set in the first scheduling period.

7. The base station according to claim 6, wherein the executable instructions, when executed by the processor, further facilitate:
  after determining the first PCRS port set and the second PCRS port set in the first scheduling period, generating port indication information corresponding to the first scheduling period; and
  transmitting the port indication information to the user equipment, wherein the port indication information facilitates the user equipment receiving the PCRS through the first PCRS port set and receiving the data through the second PCRS port set.

8. The base station according to claim 6, wherein determining the first time-frequency resource element corresponding to the at least one port to be used for transmitting the PCRS in the first PCRS port set is based on the target MCS.

9. The base station according to claim 6, wherein determining the first time-frequency resource element corresponding to the at least one port to be used for transmitting the PCRS in the first PCRS port set is based on a scheduling bandwidth.

10. The base station according to claim 6, wherein the first time-frequency resource element corresponding to the at least one port to be used for transmitting the PCRS in the first PCRS port set is determined based on: the target MCS, and an association between the target MCS and a PCRS transmission pattern.

11. A user equipment, comprising:
  a non-transitory storage medium including executable instructions; and
  a processor;
  wherein the executable instructions, when executed by the processor, facilitate:
  receiving an indication of a target modulation and coding scheme (MCS) to be used by a base station to transmit data to the user equipment;
  determining whether a phase noise compensation reference signal (PCRS) is to be received from the base station based on the target MCS;
  in response to determining the PCRS is to be received from the base station and in response to a quantity of first time-frequency resource elements being greater than or equal to 1, receiving, in a first scheduling period via a first time-frequency resource element, the PCRS from the base station, wherein the first time-frequency resource element corresponds to at least one port in a first PCRS port set; and
  receiving, in the first scheduling period via a second time-frequency resource element, the data from the base station, wherein the second time-frequency resource element is a time-frequency resource element that is not used to transmit any PCRS in a second PCRS port set in the first scheduling period, and the second PCRS port set does not comprise any port used to transmit any PCRS in the first scheduling period.

12. The user equipment according to claim 11, wherein the executable instructions, when executed by the processor, further facilitate:
  before receiving the PCRS from the base station, receiving port indication information from the base station, wherein the port indication information facilitates the user equipment receiving the PCRS through the first PCRS port set and receiving the data through the second PCRS port set.

13. The user equipment according to claim 11, wherein receiving the PCRS from the base station is based on the target MCS.

14. The user equipment according to claim 11, wherein receiving the PCRS from the base station is based on: the target MCS, and an association between the target MCS and a PCRS transmission pattern.

15. The user equipment according to claim 11, wherein the first time-frequency resource element corresponding to the at least one port to be used for transmitting the PCRS in the first PCRS port set is determined based on a scheduling bandwidth.

16. A data receiving method, comprising:
  receiving, by a user equipment, an indication of a target modulation and coding scheme (MCS) to be used by a base station to transmit data to the user equipment;
  determining, by the user equipment, whether a phase noise compensation reference signal (PCRS) is to be received from the base station based on the target MCS;
  in response to determining the PCRS is to be received from the base station and in response to a quantity of first time-frequency resource elements being greater than or equal to 1, receiving, by the user equipment in a first scheduling period via a first time-frequency resource element, the PCRS from the base station, wherein the first time-frequency resource element corresponds to at least one port in a first PCRS port set; and
  receiving, in the first scheduling period via a second time-frequency resource element, the data from the base station, wherein the second time-frequency resource element is a time-frequency resource element that is not used to transmit any PCRS in a second PCRS port set in the first scheduling period, and the second PCRS port set does not comprise any port used to transmit any PCRS in the first scheduling period.

17. The method according to claim 16, wherein before receiving the PCRS from the base station, the method further comprises:
  receiving port indication information from the base station, wherein the port indication information facilitates the user equipment receiving the PCRS through the first PCRS port set and receiving the data through the second PCRS port set.

18. The method according to claim 16, wherein the first time-frequency resource element corresponding to the at least one port to be used for transmitting a PCRS in the first PCRS port set is determined based on the target MCS.

19. The method according to claim 16, wherein the first time-frequency resource element corresponding to the at least one port to be used for transmitting a PCRS in the first PCRS port set is determined based on: the target MCS, and an association between the target MCS and a PCRS transmission pattern.

20. The method according to claim 16, wherein the first time-frequency resource element corresponding to the at least one port to be used for transmitting the PCRS in the first PCRS port set is determined based on a scheduling bandwidth.

* * * * *